United States Patent [19]

Walker

[11] Patent Number: 5,323,688
[45] Date of Patent: Jun. 28, 1994

[54] HYDRAULIC REGENERATIVE BRAKING AND FOUR WHEEL DRIVE SYSTEM

[76] Inventor: Frank H. Walker, 7271 Green Valley Dr., Grand Blanc, Mich. 48439

[21] Appl. No.: 33,245

[22] Filed: Mar. 16, 1993

Related U.S. Application Data

[63] Continuation-in-part of Ser. No. 847,578, Mar. 5, 1992, Pat. No. 5,263,401.

[51] Int. Cl.$^5$ .............................................. F01B 1/06
[52] U.S. Cl. ...................................... 91/491; 180/242; 180/243; 417/233
[58] Field of Search ..................... 180/242, 243, 308; 91/491, 477; 417/233

[56] References Cited

U.S. PATENT DOCUMENTS

| | | |
|---|---|---|
| 2,331,554 | 10/1943 | Irgens . |
| 3,259,383 | 7/1966 | Johnson et al. . |
| 3,483,888 | 12/1969 | Wurzel . |
| 3,522,760 | 8/1970 | Putman . |
| 3,583,286 | 6/1971 | Chiappulini . |
| 3,930,437 | 1/1976 | Guntert . |
| 4,062,603 | 12/1977 | Orain . |
| 4,111,618 | 9/1978 | Thibault . |
| 4,252,353 | 2/1981 | Raj et al. . |
| 4,364,615 | 12/1982 | Euler . |
| 4,404,895 | 9/1983 | Cyphelly . |
| 4,489,950 | 12/1984 | Chormey . |
| 4,506,895 | 3/1985 | Raj . |
| 4,526,383 | 7/1985 | Fuchs et al. . |
| 4,817,964 | 4/1989 | Black, Jr. . |
| 4,834,557 | 5/1989 | Dreinhoff . |
| 4,883,141 | 11/1989 | Walker ................................ 180/243 |
| 4,919,550 | 4/1990 | Lankamp . |
| 4,995,734 | 2/1991 | Schoeder . |
| 4,995,736 | 2/1991 | Haase et al. . |
| 4,997,344 | 3/1991 | Nelson et al. . |
| 5,000,282 | 3/1991 | Walker ................................ 180/243 |
| 5,017,024 | 5/1991 | Clark et al. . |
| 5,081,906 | 1/1992 | Lemaire et al. . |
| 5,092,611 | 3/1992 | Ehmsen et al. . |
| 5,101,925 | 4/1992 | Walker . |
| 5,263,401 | 11/1993 | Walker ................................ 91/491 |

OTHER PUBLICATIONS

D. L. Margolis and A. A. Frank, "Directional Stability Augmentation For All Wheel Drive Vehicles", SAE Technical Paper Series, Feb. 29–Mar. 4, 1988.
A. Kalberiah, Volkswagen AG, Germany, "Hybrid Drive Systems for Cars".
"How To Get Around The Rotary Seal Problem".

*Primary Examiner*—Richard E. Gluck
*Attorney, Agent, or Firm*—Brooks & Kushman

[57] ABSTRACT

A hydraulic system including hydraulic units serving as wheel motors and pumps is disclosed. The hydraulic units include a stationary member supporting cylinders with piston assemblies reciprocating therein. The piston assemblies have bodies and follower assemblies which follow lobes on a rotary cam. The piston assemblies serve both as pistons and as timing valves for controlling the flow of fluids. The piston assemblies may have either undercuts or internal passages in their bodies. The follower assemblies have compliant springs elastically positioning rollers between arms of a yoke to allow lateral movement of these rollers relative to the arm of the supporting yokes. Sealing mechanisms are provided which seal between the rotary cam and the stationary member to form an annular scavenge chamber. At least one sealing mechanism has a non-rotating annular intermediate member which pilots relative to the rotary cam. A static seal accommodates radial movement between the stationary and intermediate members. A dynamic seal, preferably a ferrofluidic seal, is interposed between the intermediate member and the rotary cam.

17 Claims, 18 Drawing Sheets

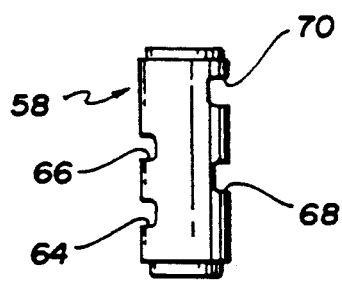
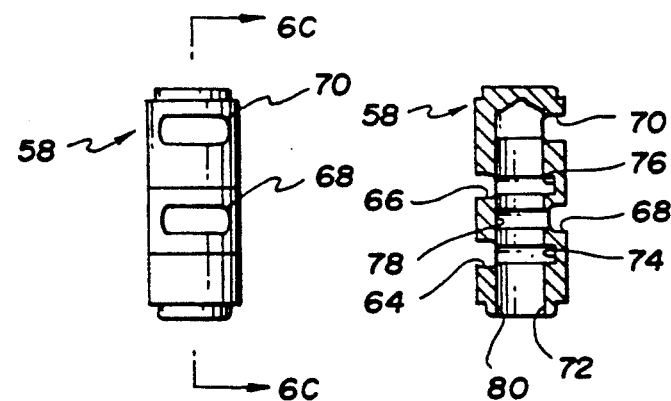
*Fig. 6a*   *Fig. 6b*   *Fig. 6c*
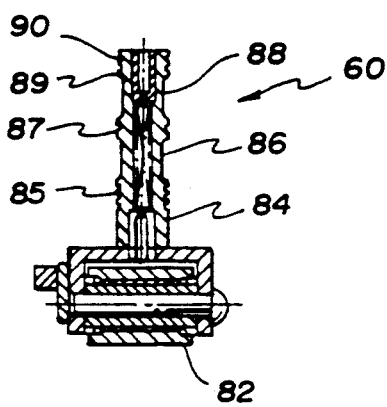
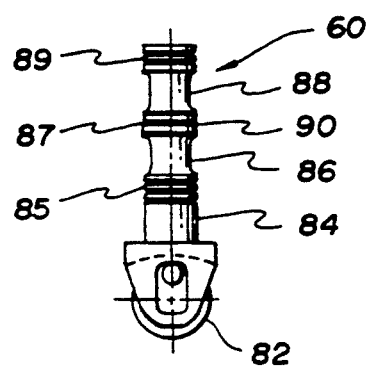
*Fig. 7a*   *Fig. 7b*
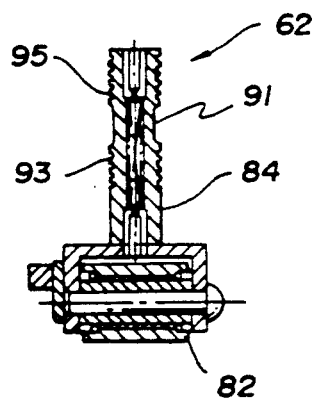
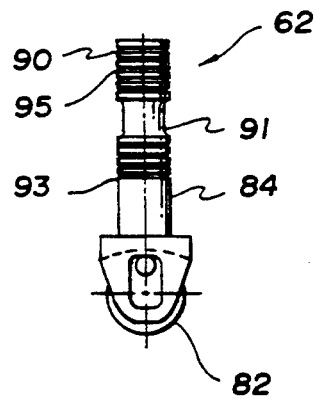
*Fig. 8a*   *Fig. 8b*

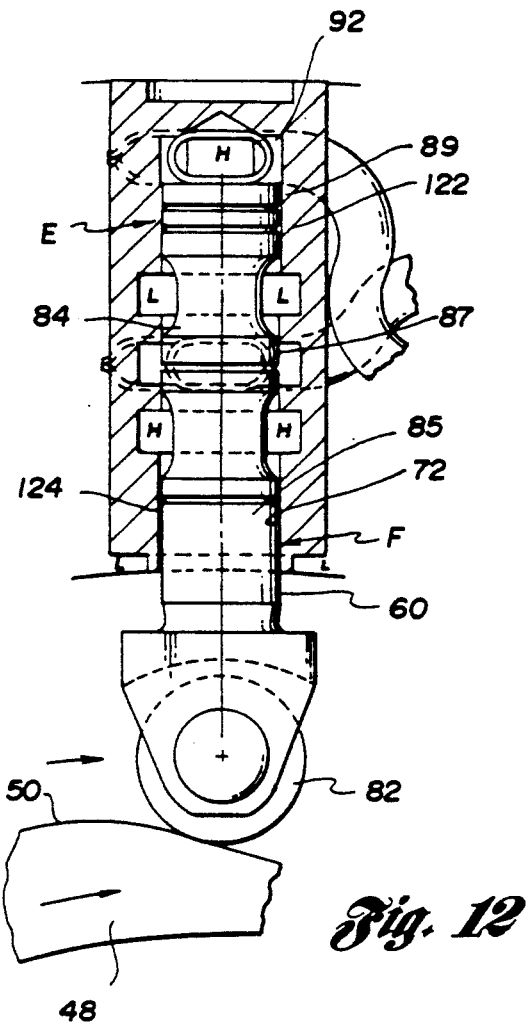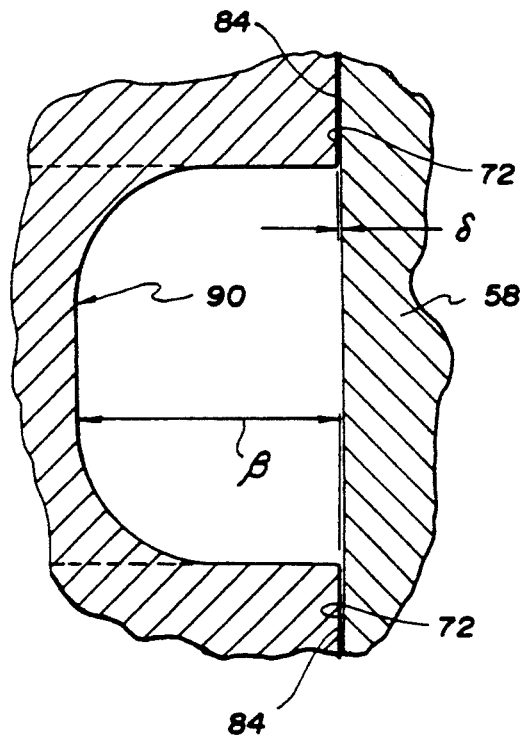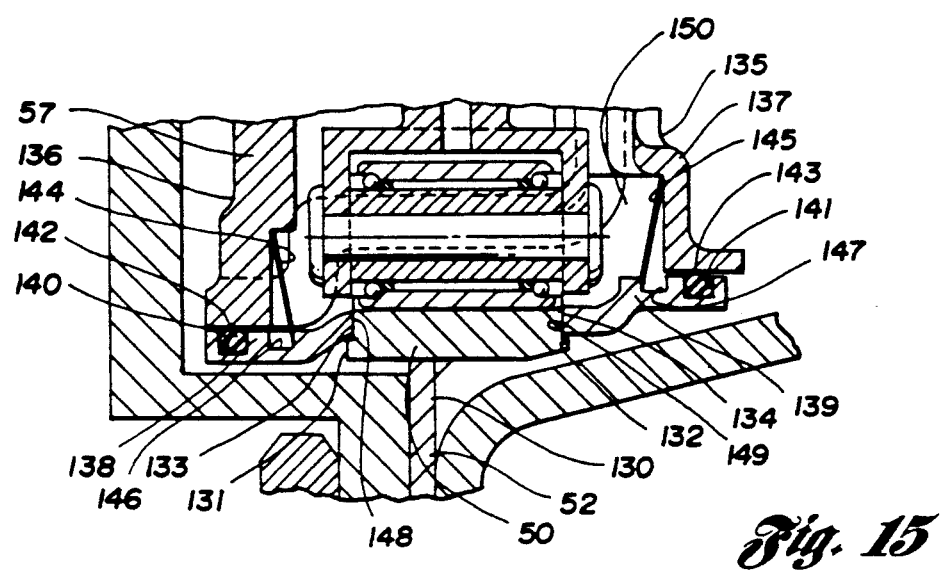

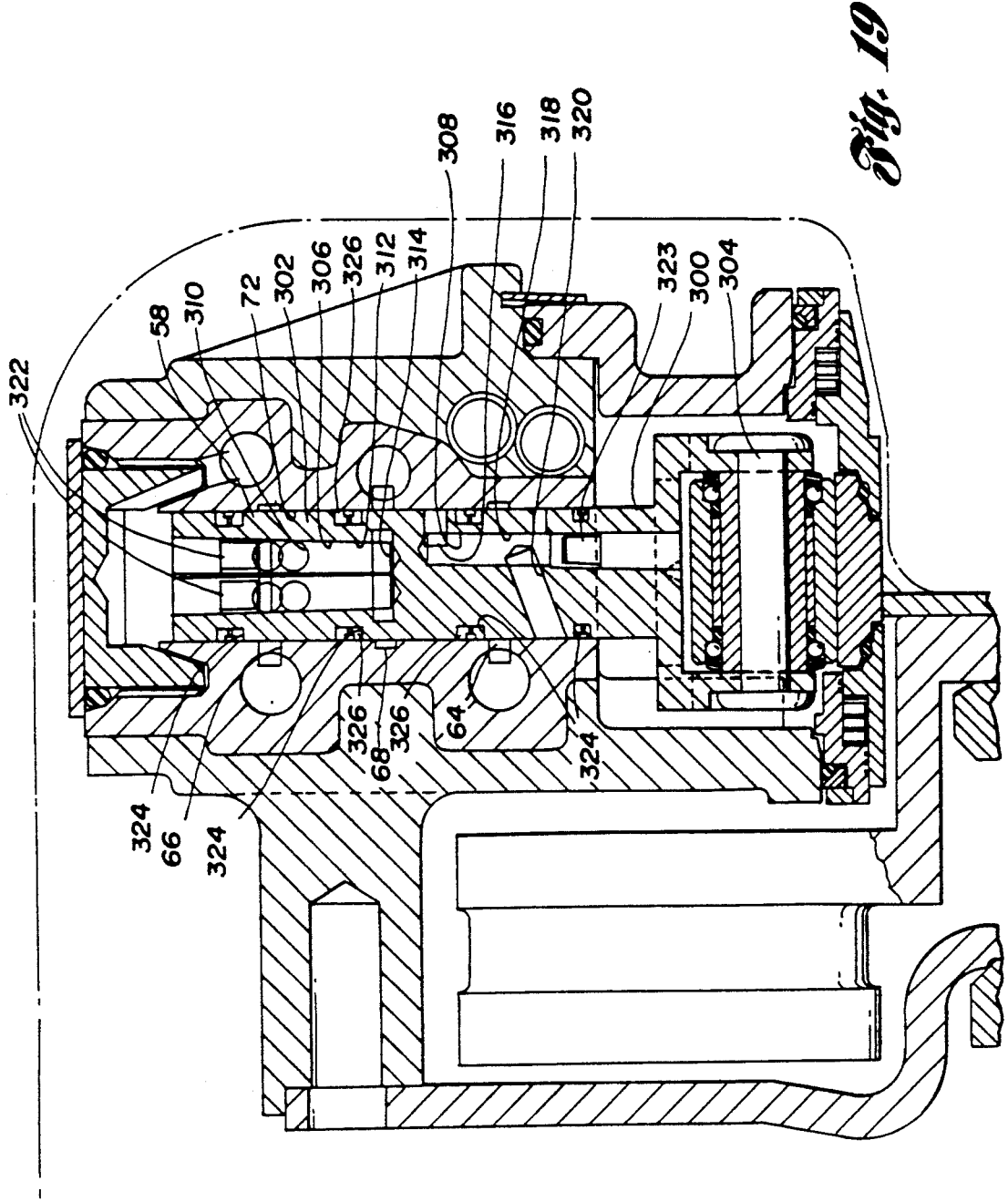

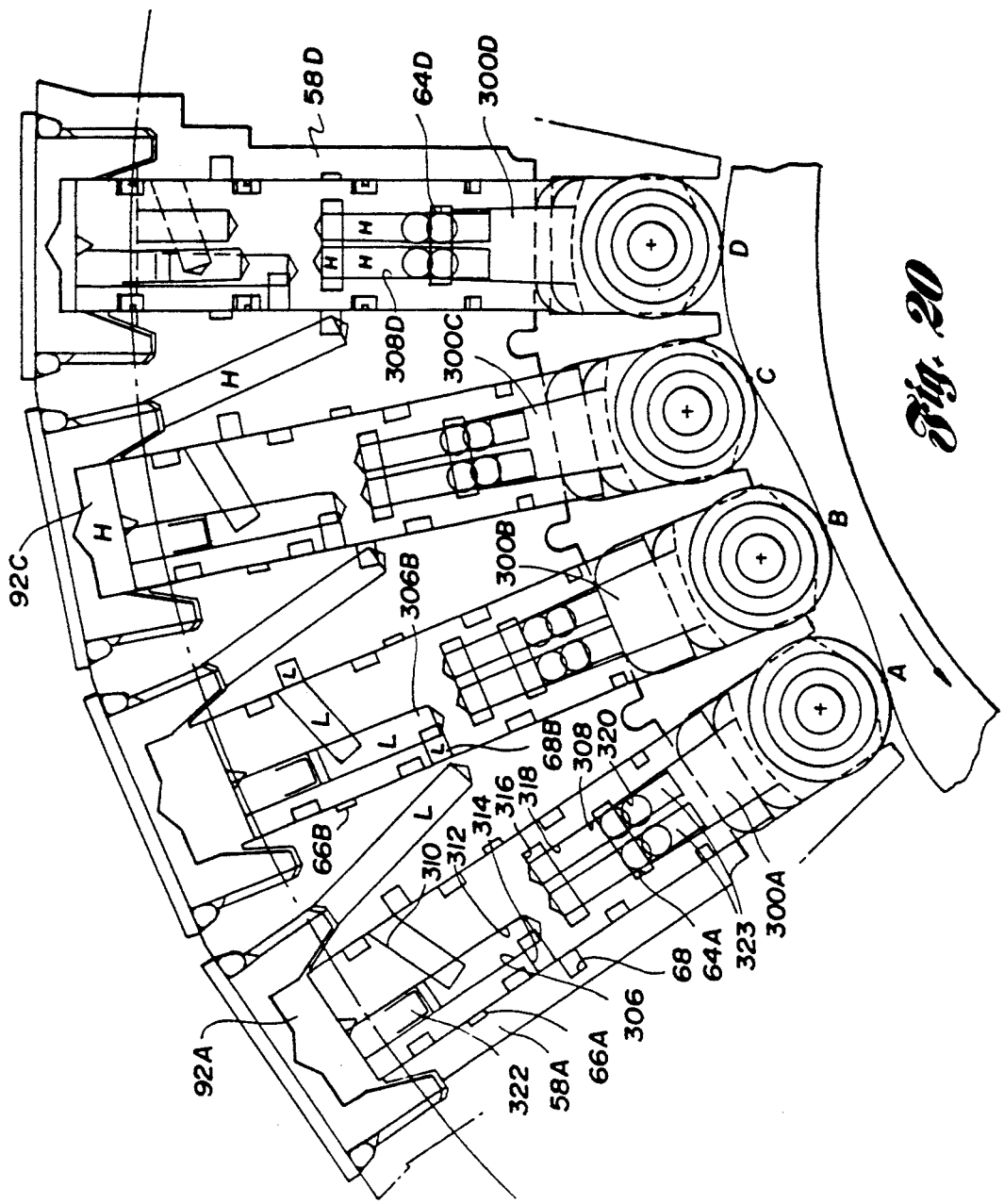

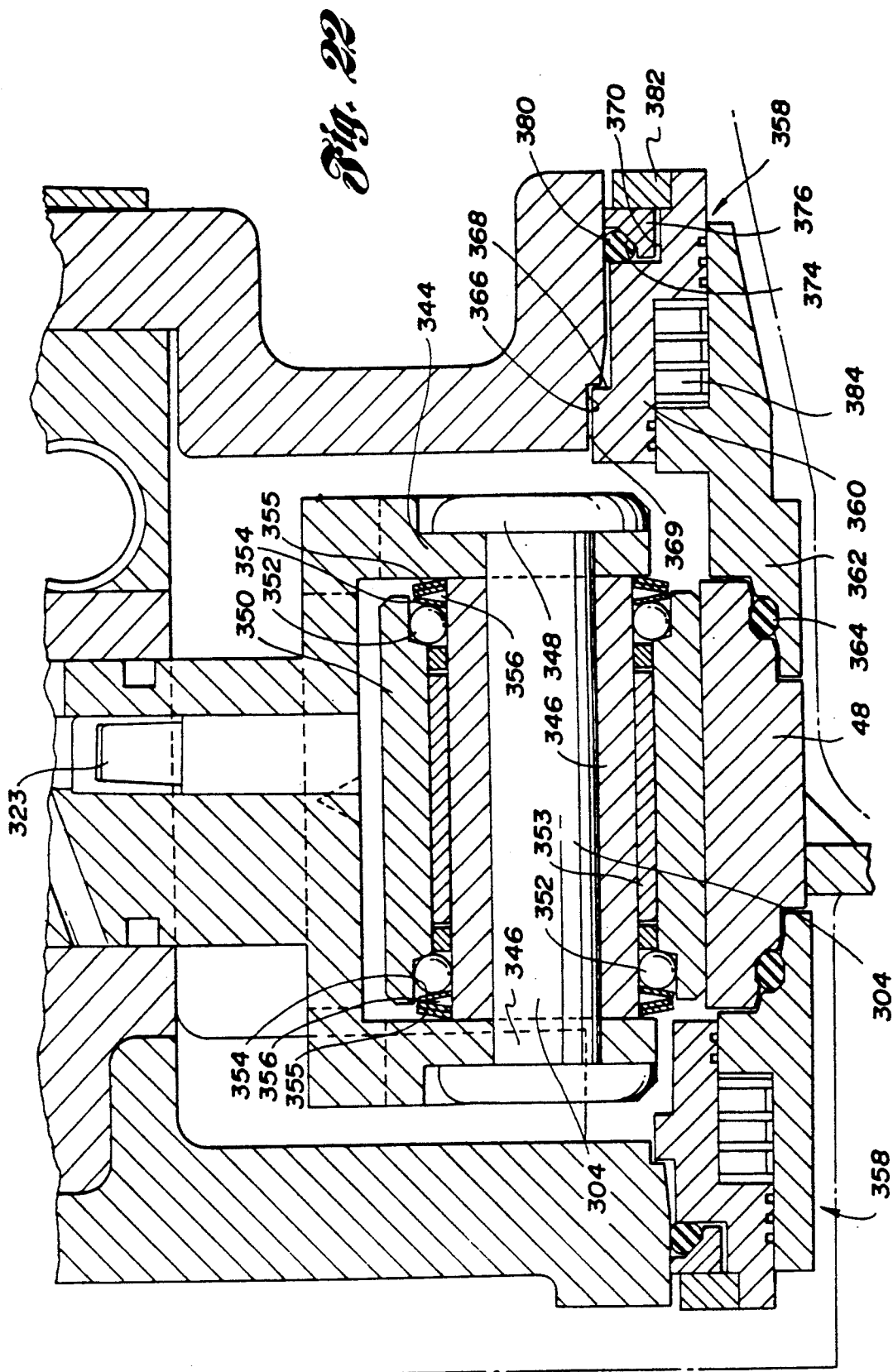

HYDRAULIC REGENERATIVE BRAKING AND FOUR WHEEL DRIVE SYSTEM

CROSS REFERENCE TO RELATED APPLICATIONS

This application is a continuation in part to U.S. Ser. No. 07/847,578, now U.S. Pat. No. 5,263,401, entitled "Hydraulic Regenerative Braking And Four Wheel Drive System" filed on Mar. 5, 1992.

FIELD OF INVENTION

This invention relates generally to vehicle hydraulic drive systems, and more particularly, to systems using hydraulic wheel motors and pumps.

INCORPORATION BY REFERENCE

The present application incorporates by reference U.S. Pat. Nos. 4,883,141 and 5,000,282, issued to Walker, entitled "Hydraulic Wheel Motor and Pump" which issued Nov. 28, 1989 and Mar. 19, 1991, respectively. Also, U.S. Pat. No. 4,252,353, issued to Raj et al on Feb. 24, 1981, and entitled "Self-Activating Ferrofluidic Seals" is incorporated into this application.

BACKGROUND OF THE INVENTION

Wheel motors and pumps for vehicles, hydraulic drive systems, systems using accumulators for regenerative braking and acceleration, and methods of casting cylinders made of a first material within a second material are known. The following references relate to the above listed subject matter.

U.S. Pat. Nos. 4,883,141 and 5,000,282 to Walker disclose hydraulic wheel motor and pump units for use with a pair of mechanically and a pair of non-mechanically driven wheels, respectively, to modify a two-wheel drive vehicle into a four-wheel drive vehicle. The flow of fluid into and out of cylinders of the hydraulic units are controlled by timing valve assemblies which are separate from piston assemblies reciprocating within the cylinders. The cylinders are housed within machined castings which are affixed to the vehicle. Further, seals are provided between the cylinders and piston assemblies to prevent leakage from the hydraulic units.

A number of patents show hydraulic vehicle drive systems having fluid accumulators for storing energy during vehicle deceleration and using the stored energy to assist in vehicle acceleration. These systems typically input and output energy relative to accumulators by way of vehicle drivetrains. Examples include U.S. Pat. Nos. 4,813,510, 4,745,745, 4,387,783, 4,350,220, and 4,215,545.

Rohde, U.S. Pat. No. 4,663,935, discloses an energy storage and retrieval system for a vehicle. A hydraulic pump/motor device, connected with a hub portion of a wheel, uses pressurized hydraulic fluid which is stored in a tire portion of the wheel. The system is confined to use with a single tire and wheel.

A number patents describe cylinders made of a first high strength material being cast within a second lower strength material. Examples of this type of casting procedure may be found in U.S. Pat. Nos. 5,005,469, 4,872,396, and 3,069,209. However, none show hydraulic wheel motors or pumps.

SUMMARY OF THE INVENTION

A hydraulic regenerative braking and four wheel drive system for a vehicle is provided. The system includes a fluid accumulator, hydraulic units comprising stationary members and cooperating rotary cams, filter assemblies, fluid reservoirs and spool valves for controlling the flow of fluid in the system.

The system may be operated in a regenerative braking mode wherein at least some of the hydraulic units operate as pumps to provide high pressure fluid to the accumulator during vehicle deceleration or braking, and wherein at least some of the hydraulic units operate as motors, receiving high pressure fluid from the accumulator during vehicle acceleration. The system may also be operated in a four-wheel drive mode wherein a pair of hydraulic units, connected to a pair of mechanically driven wheels, act as pumps to drive a pair of hydraulic units, acting as motors, to rotate a pair of non-mechanically driven wheels. Alternatively, the hydraulics units may be disengaged from the rotary cams to allow the wheels to turn freely when the regenerative mode or four-wheel drive mode is not needed. The hydraulic units are configured to fit within the vehicle's wheel and adjacent brake calipers.

A charging pump and an on/off spool valve control whether the hydraulic regenerative braking system is engaged with the wheels of the vehicle. Fluid is pumped from vacuum and storage reservoirs through the on/off spool valve into the remainder of the system to engage the hydraulic units with the wheels. If fluid is removed from the hydraulic units and drained into the reservoirs, the hydraulic units will disengage from the vehicle wheels.

A mode spool valve is selectively positioned to place the system into either the regenerative braking mode or the four wheel drive mode. When the mode spool valve is set to the four-wheel drive mode, the hydraulic units are isolated from the fluid accumulator. Instead, the hydraulic units circulate fluid among themselves, with high pressure fluid being pumped from hydraulic units associated with mechanically driven wheels to drive hydraulic units associated with non-mechanically driven wheels.

When the mode spool valve is positioned into the regenerative braking mode, the hydraulic units will be placed into fluid communication with the fluid accumulator. A regenerative spool valve is selectively positioned so as to operate hydraulic units as pumps during vehicle deceleration and to operate hydraulic units as motors during vehicle acceleration. High pressure fluid, and accordingly energy, is stored in the accumulator during vehicle deceleration. Conversely, the high pressure fluid is withdrawn from the accumulator to assist in the vehicle acceleration.

Filter assemblies are provided to filter fluid flowing to and from the hydraulic units. Fluid is allowed to flow through the filter assemblies in either a first direction or a second direction. However, the fluid flows only in a single direction through a filter element in the filter assembly to prevent back flushing of the filter element. If the filter element is blocked, fluid will bypass the filter element and continue through the filter assembly in its original direction of flow.

The hydraulic units preferably can operate both as wheel motors and as wheel pumps. Each hydraulic unit includes a stationary member and a rotary cam. The stationary member is affixed to the vehicle relative to the rotary cam which is attached to and rotates with one of the vehicle wheels.

The stationary member is comprised of first A, second B, scavenge and air vent conduits, a plurality of cylinders and cooperating piston assemblies, and control conduits interconnecting between the cylinders in a cluster of cylinders. Preferably, each cluster has four cylinders. The cylinders are positioned using a pair of fixturing plates. The A, B and control conduits are brazed to the cylinders, and to the scavenge and air conduits, to form an insert. Alternatively, the insert may also include secondary A' and B' conduits connecting to a secondary pair of clusters.

The insert is then cast within a lightweight metal to form a support casting. The ends of the A, B, (A' and B'), scavenge and air vent conduits have openings which open outwardly from the casting. A metallic collar plate surrounds and is brazed or welded to the conduits. A valve body and interceding seals are affixed to the casting and collar plate to prevent fluid from escaping from between the casting and the valve body. The casting is circumferentially closed for rigidity and strength and is also configured to fit about a brake caliper when the stationary member is secured to the vehicle.

The stationary member further includes seals components and a cover plate. Seals are provided to seal between laterally mating surfaces on each rotary cam and respective flanges on the casting and a cover plate to form a scavenge chamber. The seals prevent fluid leaking onto the wheel and its braking components. The scavenge chamber is drained and evacuated by the scavenge conduit with fluid being replaced with air passing through the air vent conduit.

The hydraulic units are connected by way of the valve bodies to passageways, carrying low and high pressure fluid, which lead to other hydraulic units or to the various spool valves. Each cylinder has axially spaced A and B ports, a control port and a chamber port. The A and B ports of the cylinders are fluidly connected and brazed or welded to their respective A and B conduits. Each control port is alternately fluidly connected to its respective A and B ports by an undercut or timing valve in associated piston assembly during the reciprocation of a piston assembly within its cylinder. Each piston assembly and cylinder cooperate to form a variable volume chamber. The chamber port is in communication with the chamber.

The cylinders are preferably arranged in clusters of four interconnected cylinders, with each cluster being diametrically opposed by another cluster of cylinders in the insert of the stationary member. Each control port is connected by a control conduit to the chamber port of an adjacent cylinder in a cluster so that all the cylinders in a cluster are interconnected by control conduits. Preferably, the A and B conduits connect to each of the A and B ports of the cylinders of each diametrically opposed pair of clusters. Likewise, in stationary members including the secondary set of A' and B' conduits and clusters of cylinders, the A' and B' conduits connect, independently of the A and B conduits, to respective A and B ports of the secondary clusters of cylinders.

The four cylinders and piston assemblies of each cluster are spaced one-quarter cycle apart wherein each cycle is the length of a lobe on the rotary cam. The interaction of the piston assemblies and rotary cams results in the hydraulic units acting either as a pump to pump fluid or as a motor receiving fluid to drive a wheel, depending on which of the A and B conduits carries the higher pressure fluid and which way the associated vehicle wheel is rotating.

Each piston assembly has a body and a follower, the body sealingly cooperating with a cylinder to define a variable volume chamber. The body of the piston assembly has one or more undercuts therein which serve as a timing valve for controlling the flow of fluid into and out of a chamber of adjacent cylinder and piston assembly. Therefore, each piston assembly operates both as timing valve, or controlling piston assembly, controlling the flow of fluid to the chamber of an adjacent piston assembly and cylinder, and also acts as a piston, or controlled piston assembly, responsive to fluid flowing into and out of its associated chamber from the timing valve of an adjacent controlling piston. Alternatively, internal passages may be placed in the piston assemblies to alternately fluidly connect and disconnect the control port with the A and B ports of the cylinders as the piston assemblies reciprocate.

Each body of a piston may include a circumferentially extending seal recess which receives a seal ring. Ideally, the seal ring is C-shaped in cross-section having an annular recess in its outer diameter formed by a first segment, a second segment and a bight segment which connects the first and second segments. The bight segment has openings extending from its outer diameter to its inner diameter to allow fluid to pass therethrough. When the first and second segments are subjected to fluids of differing pressures, only the segment adjacent the lower pressure fluid will seal between the body and its cylinder.

Ideally, the piston assemblies each include a follower assembly having a yoke with a pair of laterally spaced arms and a roller pin extending longitudinally between and supported by the arms. A roller is rotatably supported on the roller pin by bearings. A pair of compliant springs are axially or laterally interposed between the arms of the yoke and the bearings or roller to allow the roller to move laterally between the arms of the yoke. Accordingly, only small end thrust loads are transferred from the roller to the yoke and to the body of the piston assembly during operation of a hydraulic unit.

The hydraulic units may employ an alternative sealing embodiment utilizing a pair of sealing mechanisms which seal between the stationary member and the rotary cam to provide an annular scavenge chamber for collecting fluid which escapes from between the piston assemblies and the cylinders. Ideally, each sealing mechanism includes an annular non-rotating intermediate member which pilots relative to and remains concentric with the rotary cam during rotation of the rotary cam. An annular dynamic seal is interposed between the intermediate member and the rotary cam to accommodate rotational movement therebetween. An annular static seal is placed between the intermediate member and the stationary member to seal and to accommodate radial movement between those members. Preferably, an inner race member is affixed to the rotary cam with the dynamic seal sealing between the inner race member and the intermediate member.

An object of the present invention is to provide a hydraulic unit which has a cluster of cylinders and cooperating piston assemblies wherein each piston assembly operates as a piston to either pump fluid or drive a rotary cam and simultaneously operates a timing valve to control the flow of fluid into and out of a chamber bounded by an adjacent piston assembly and cylinder.

Still yet another object is to provide a piston assembly with a follower assembly having a roller supported between arms of a yoke with compliant springs disposed between the roller and the arms of the yoke to allow lateral movement therebetween to thereby reduce end thrust loads which cause friction between the body of the piston assembly and the bore of a cylinder.

An additional object is to provide a hydraulic unit having a stationary member, rotary cam and a sealing mechanism which laterally seals between the stationary member and the rotary cam to form a scavenge chamber capturing fluid ,therein and preventing fluid from escaping from the hydraulic unit onto the braking components of a vehicle wheel.

An further object is to provide an annular non-rotating intermediate member between a rotary cam and a stationary member with a static seal sealing between the stationary member and the intermediate member and accommodating radial movement therebetween and a dynamic seal interposed between the rotary cam and the intermediate member with the intermediate member piloting relative to the rotary cam.

These and other objects, features and advantages of the present invention will be more fully understood with reference to the drawings, specification and claims.

BRIEF DESCRIPTION OF THE DRAWINGS

FIGS. 6A, 6B and 6C, respectively, are front, side and sectional views of a cylinder;

FIGS. 7A and 7B are front and side views of a piston assembly used with the hydraulic units of the front wheels;

FIGS. 8A and 8B are front and side views of a piston assembly preferably used with hydraulic units of the rear wheels;

FIG. 11D shows the cluster of FIG. 11B operating as a pump with the rotary cam rotating in a forward direction;

FIG. 12 is a side view of a piston assembly and cylinder wherein the body of the piston assembly is shown with an exaggerated taper;

FIG. 13 is an enlarged fragmentary schematic view of a labyrinth seal groove adjacent a cylinder bore;

FIG. 15 is an enlarged fragmentary view of the sealing mechanism shown in FIG. 10;

FIG. 19 is a front elevational view of an alternative piston assembly which reciprocates within a cylinder and has internal passages therein;

FIG. 20 is a side elevational view of a cluster of piston assemblies and cylinders which utilize piston assemblies having the internal passages;

FIGS. 21A-D show a seal ring adapted to fit in a seal recess in the body of a piston assembly;

FIG. 22 is an enlarged view from FIG. 19 showing an alternative pair of sealing mechanisms disposed between the stationary member and the rotary cam.

BEST MODES FOR CARRYING OUT THE INVENTION

I. Introduction

Figure 1:
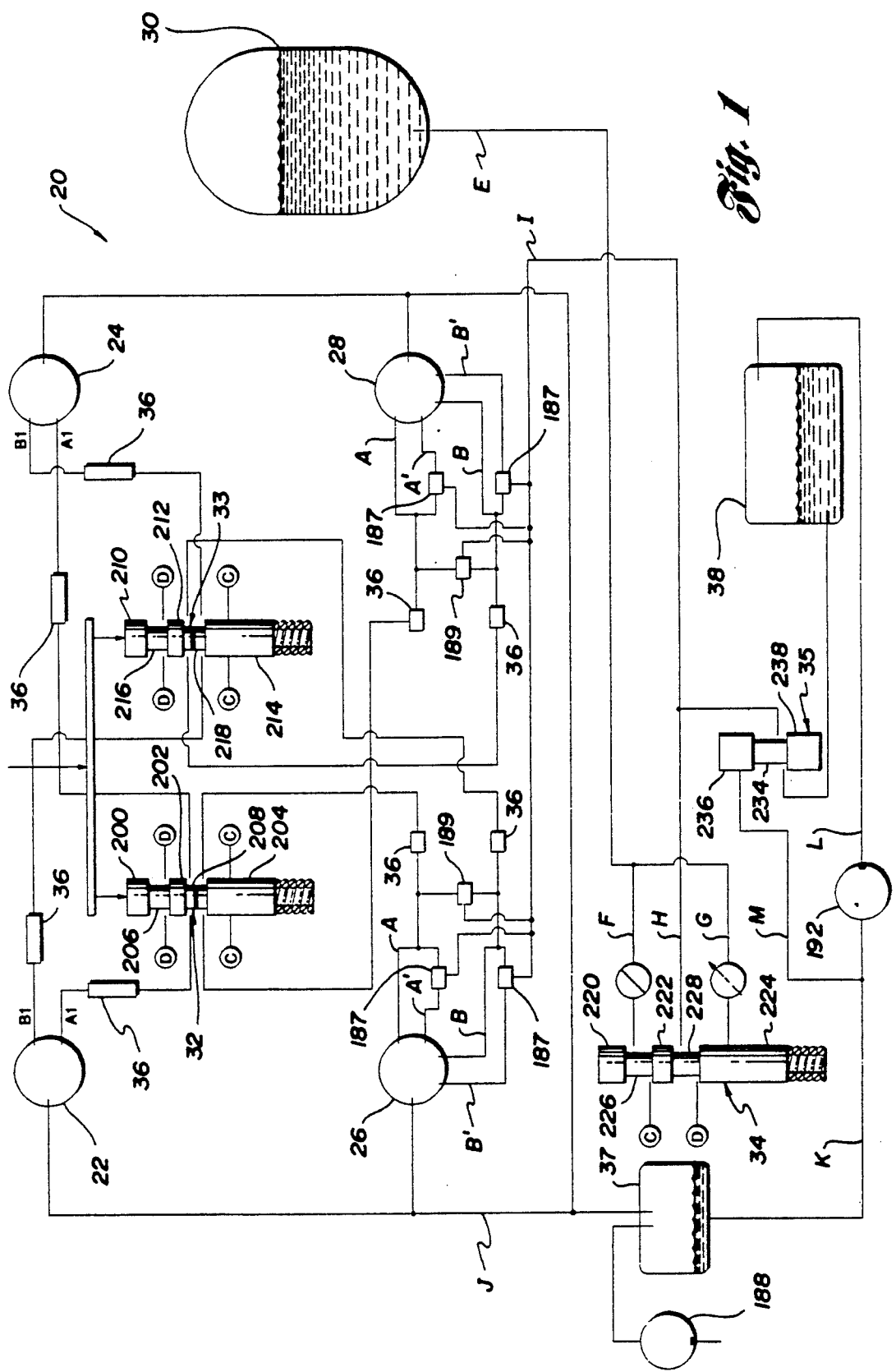
FIG. 1 is a schematic view of a hydraulic regenerative braking and four wheel drive system made in accordance with the present invention.

Hydraulic regenerative braking and four wheel drive system 20 is shown schematically in FIG. 1. Hydraulic units 22, 24, 26 and 28, affixed relative to a vehicle's wheels (not shown), cooperate with each other and a fluid accumulator 30. System 20 can be operated in a four wheel drive mode, or else in regenerative braking mode, or else disengaged from the vehicle wheels. First and second mode spool valves 32 and 33, regenerative mode spool valve 34 and on/off spool valve 35 controls the flow of fluid throughout system 20. Filter assemblies 36 filter the fluid flowing to and from the hydraulic units 22, 24, 26 and 28. Vacuum and storage reservoirs 37 and 38 store fluid in addition to fluid accumulator 30. The operation of the hydraulic units 22, 24, 26, and 28 and filter assemblies 36 will first be described and then the overall system 20.

II. Hydraulic Units and Their Operation

Figure 2:
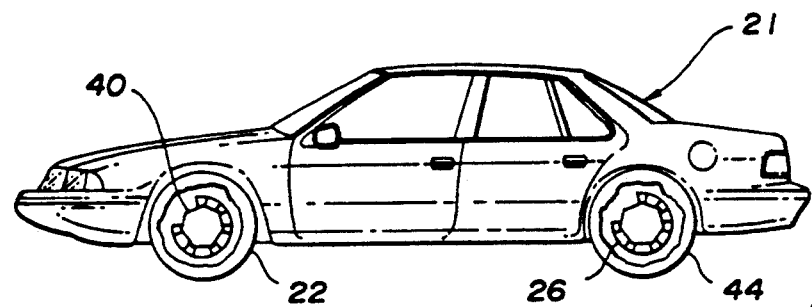
FIG. 2 is a side elevation of a motor vehicle showing the location of a pair of hydraulic units locating within a vehicle wheel.
Figure 3:
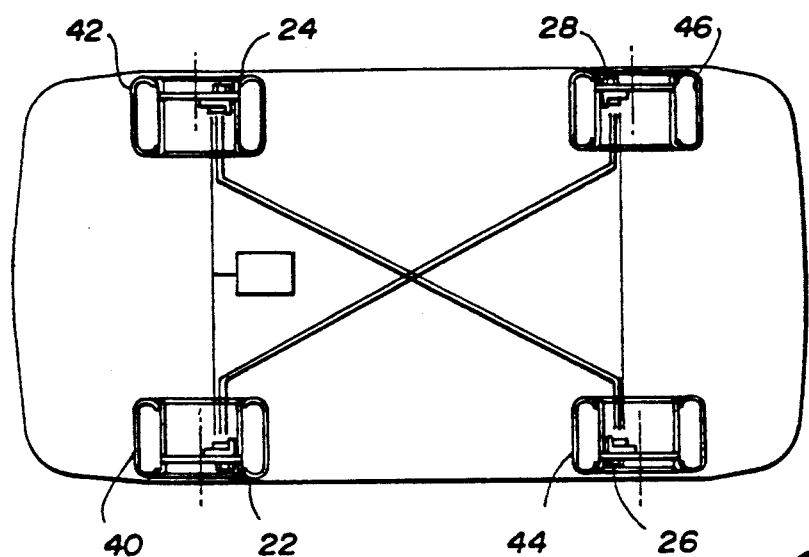
FIG. 3 is a schematic top view of the vehicle in FIG. 1.

FIGS. 2 and 3 show a motor vehicle 30 which is provided with left and right front wheels 40 and 42 and left and right rear wheels 44 and 46. Front wheels 40 and 42 are equipped with hydraulic units 22 and 24 and rear wheels 44 and 46 are equipped with hydraulic units 26 and 28. Preferably, front wheels 40 and 42 are mechanically driven in a conventional front-wheel drive manner. The invention can also be used on conventional rear-wheel drive vehicles and is equally adaptable to vehicles having automatic or manual transmissions.

Figure 4:
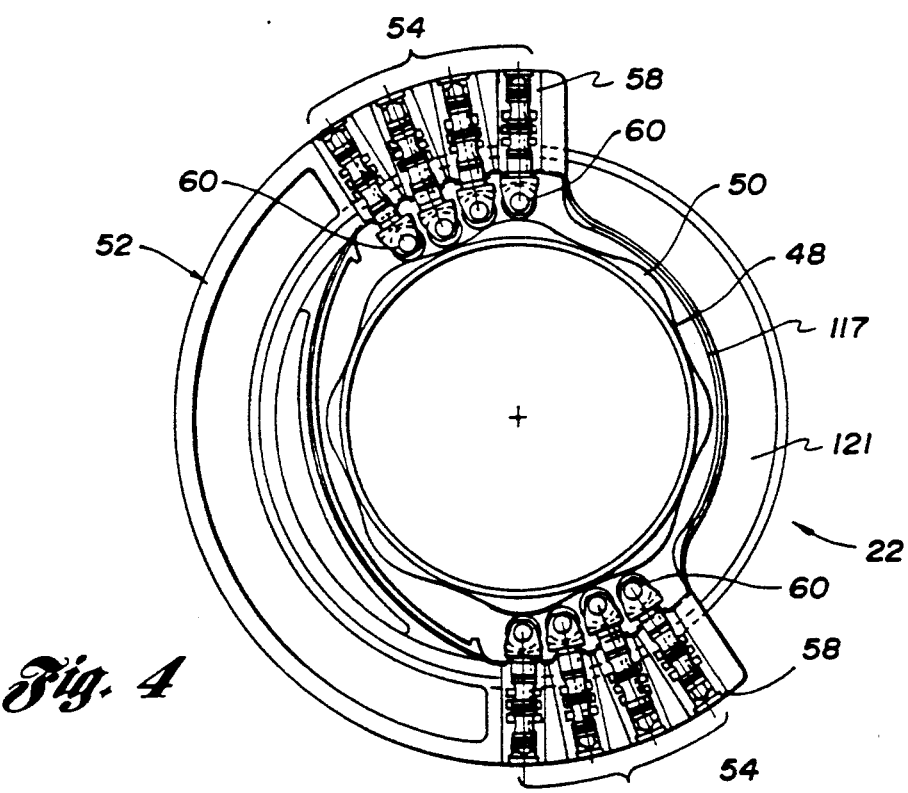
FIG. 4 is a schematic side view of a hydraulic unit used with front vehicle wheels.

FIG. 4 shows a schematic view of hydraulic unit 22. Hydraulic unit 24 is generally a mirror image of hydraulic unit 22. Therefore, the description of hydraulic unit 22 is also applicable to hydraulic unit 24. Hydraulic unit 22 includes a rotary cam 48 and a stationary member 52. Rotary cam 48 has a plurality of circumaxially spaced lobes 50, preferably eight, spaced along its radial outer periphery. The rotary cam 48 is affixed to wheel 40 to rotate therewith. Preferably threaded fasteners are used for securement, however, rotary cam 48 may also be welded to wheel 40.

A. Piston Assemblies Operate Both As Pistons and Timing Valves

Stationary member 52 has a pair of diametrically opposed clusters 54 of four circumaxially spaced cylinders 58. Each cylinder 58 houses a piston assembly 60 which reciprocates within cylinder 58 in response to the rotary motion of rotary cam 48 when piston assembly 60 is engaged with a rotary cam 48.

Figure 5:
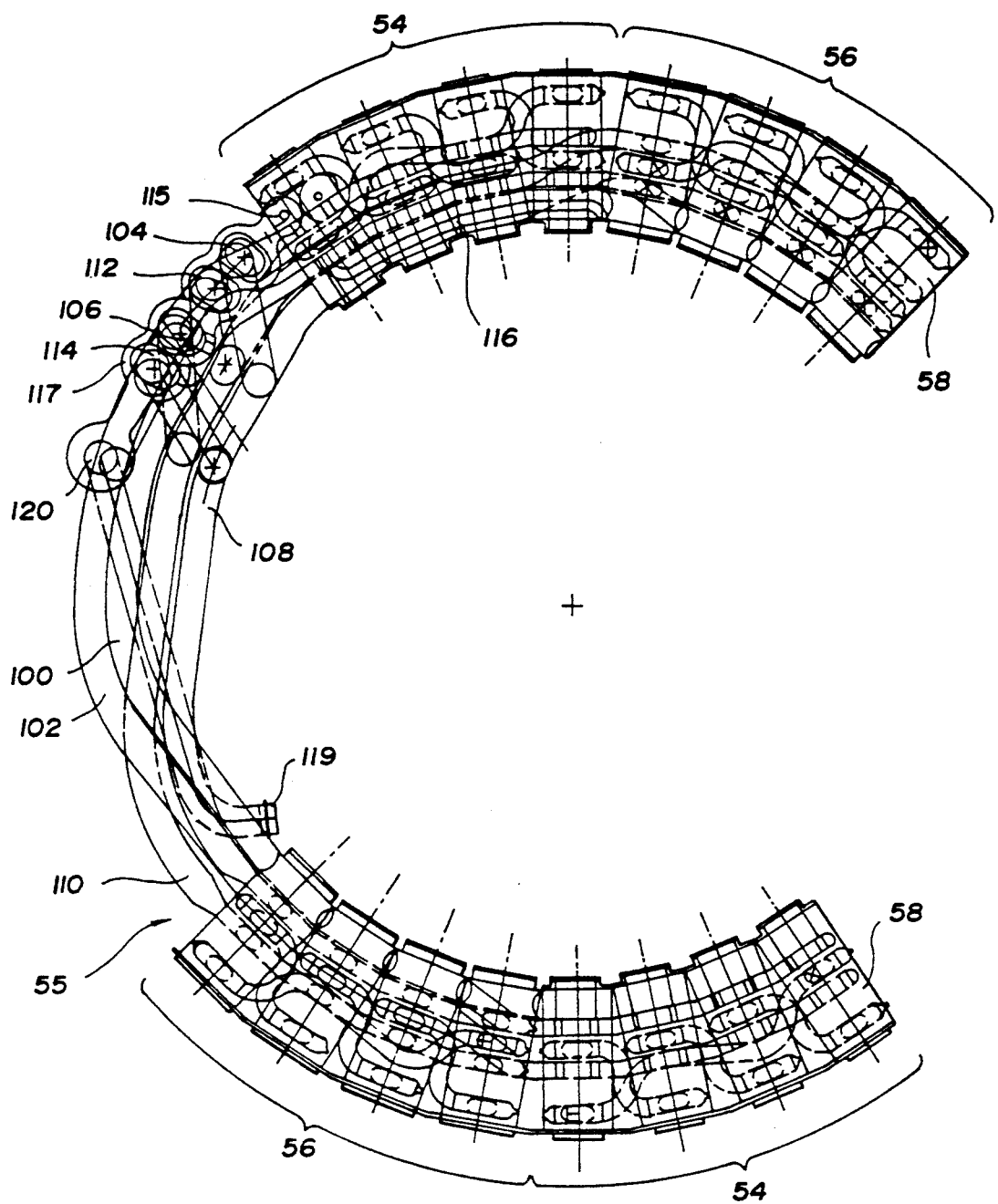
FIG. 5 is a side view of an insert having cylinders and interconnecting conduits.

FIG. 5 schematically illustrates an insert 55 of a stationary member 53 which preferably is used with hydraulic units 26 and 28, i.e., the hydraulic units associated with the non-mechanically driven wheels. As will be described in more detail later, a lightweight metal, preferably aluminum or magnesium, is cast about insert 55 to form a supporting casting 57. Again, the stationary members 53 on hydraulic units 26 and 28 are essentially mirror images of one another.

Stationary member 53 is structurally similar to stationary member 52. However, stationary member 53 also includes a second pair of diametrically opposed clusters 56 of cylinders 58, for a total of four clusters of cylinders 58. U.S. Pat. No. 4,883,141 describes how the fluid engagement of a second pair of clusters of cylinders in a hydraulic unit acting as a motor provides additional torque to drive non-mechanically driven wheels relative to using only a single pair of clusters.

Preferably, piston assemblies 62, shown in FIGS. 8A and 8B, rather than piston assemblies 60, shown in FIGS. 7A and 7B, are used with stationary members 53 of hydraulic units 26 and 28 for reasons to be discussed later. The piston assemblies 60 are preferably used with stationary members 22 and 24 located adjacent the mechanically driven wheels.

Cylinders 58 reciprocally house either piston assemblies 60 or 62. FIGS. 6A, 6B and 6C show a cylinder 58 which has a plurality of longitudinally spaced ports including A port 64, B port 66, control port 68 and chamber port 70. As seen in FIG. 6A, in the preferred embodiment, A and B ports 64 and 66 are located on opposite sides of cylinder 58 from control and chamber ports 68 and 70. Each of the ports is generally oval-shaped and is reversed tapered.

FIG. 6C shows a sectional view through cylinder 58. Cylinder 58 has an interior bore 72 sized to receive a piston assembly 60 or 62. Located in bore 72 adjacent A port 64, B port 66, and control port 70, respectively, are interior annular recesses 74, 76 and 78. The end of cylinder 58, adjacent chamber port 70, is closed while the opposite end has an opening 80 for receiving either of piston assemblies 60 or 62.

FIGS. 7A and 7B show the preferred embodiment of piston assembly 60, which preferably is used with hydraulic units 22 and 24. Piston assembly 60 has a roller follower 82 mounted on bearings and a longitudinally extending body 84. Along the outer periphery of body 84 are a pair of longitudinally spaced circumferential undercuts 86 and 88. Longitudinally spaced spools 85, 87, and 89, respectively, are located adjacent undercuts 86 and 88 and preferably have three, one, and three circumferential labyrinth seal grooves 90 located therein.

FIG. 13 shows a greatly enlarged schematic view of a labyrinth seal groove 90 located adjacent bore 72 of a cylinder 58. In the preferred embodiment, groove 90 has a depth $\beta$ of 0.020" and a minimum nominal radial clearance $\delta$ of 0.0003" between body 84 and bore 72. Of course, other depths and clearances will also work. Labyrinth seal grooves 90 are utilized to decrease leakage caused by the radial clearance $\delta$ between the body 84 and bore 72. Testing has shown that leakage is substantially reduced or eliminated by labyrinth seal grooves 90. What would be a high velocity jet stream in the radial clearance $\delta$ is essentially arrested by producing an abrupt change in flow area: preferably in the range of 60/1 to 100/1 area ratio.

FIGS. 8A and 8B show piston assemblies 62 which are preferably used in hydrostatic units 26 and 28. Piston assemblies 62 are similar to piston assemblies 60 with an exception that body 84 has only a single circumferential undercut 91 and adjacent longitudinally spaced spools 93 and 95. Spools 93 and 95, respectively, preferably have four and five labyrinth groove seals 90.

Both piston assemblies 60 and 62 have pressure relief ports and mechanisms along the longitudinal axes of their bodies 84. These mechanisms allow fluid to pass from the end of bodies 84 through a central passageway and exit adjacent the roller followers 82. This occurs in the event an over pressure condition arises between cylinder 58 and one of the piston assemblies 60 or 62. Details on the operation this safety feature is more fully described in U.S. Pat. No. 4,883,141.

FIG. 5 shows insert 55 having clusters 54 and 56 of cylinders. The respective A and B ports 64 and 66 of cylinders 58 of clusters 54 are fluidly interconnected, respectively, by partially circumferentially extending radially inner A conduit 100 and radially outer radial B conduit 102. A conduit 100 and B conduit 102 include A and B openings 104 and 106 which are adapted to fluidly connect to the remainder of system 20, as will be described later. Similarly, the A and B ports 64 and 66 of cylinders 58 of clusters 56 are fluidly connected together, respectively, by partially circumferentially extending radially inner A' conduit 108 and radially outer B' conduit 110, which have openings 112 and 114 adapted for coupling to the remainder of system 20.

Air vent conduit 116 extends between the top of the radial interior of insert 55 and air vent opening 115. A scavenge conduit 119 connects between the radial interior of insert 55 and an outer scavenger opening 120. A collar plate 117 surrounds the openings 102, 104, 106, 114, 115, and 120 which open axially rather than radially. The insert 55 for stationary member 52 does not have the A' and B' openings 112 and 114 and A' and B' conduits 108 and 110 as the secondary set of clusters 56 are not provided.

Figure 9:
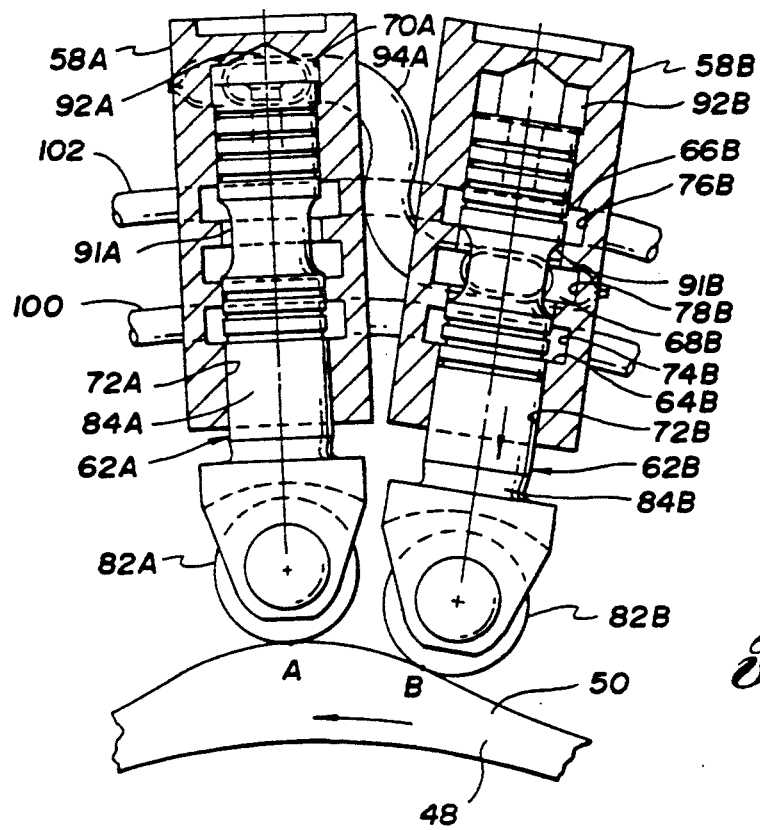
FIG. 9 is a side view of a pair of cooperating piston assemblies and cylinders.

FIG. 9 demonstrates how one piston assembly 62 operates simultaneously as a timing valve and as piston. Rather than show the entire insert 55, for simplicity, only a pair of cylinders 58 and piston assemblies 62 are shown. The cylinders 58 and piston assemblies 62, and their corresponding components, will be designated with the letters A and B for the purposes of differentiation. Similarly, locations along lobe 50 have been identified as points A and B.

Piston assemblies 62A and 62B reciprocally cooperate within cylinders 58A and 58B to define a pair of variable volume bounded chambers 92A and 92B between the ends of bodies 84A and 84B and the enclosed ends of bores 72A and 72B. A control conduit 94A fluidly connects control port 68B with chamber port 70A and its associated chamber 92A. Therefore, all the fluid passing into and out of chamber 92A must pass through control port 68B and control recess 78B in bore 72B (except for the fluid escaping between body 84A and bore 72A and any fluid passing through the internal pressure relief valves of the piston assembly 62B.)

Undercut 91B of piston assembly 62B acts as a timing valve for controlling the flow of fluid into and out of chamber 92A. Similarly, as will be later explained, undercuts 86 and 88 of piston assemblies 60 also serve as timing valves.

Piston assembly 62B is radially positioned and reciprocated by the interaction of roller follower 82B and lobe 50 of rotary cam 48. The positioning of undercut 91B controls whether control port 68B will be fluidly connected to A port 64B or B port 66B or to neither. The A ports 64A and 64B are fluidly connected A conduit 100 and B ports 66A and 66B are fluidly connected to B conduit 102.

Piston assembly 62B and undercut 91B are shown in FIG. 7 as moving radially downwardly to follow the contours of lobe 50 as the rotary cam 48 rotates in a counterclockwise direction, which shall be considered to be the direction of rotation when the vehicle is moving forward. Undercut 91B is instantaneously shown in a cross-over position being fluidly isolated from both A port 64B and B port 66B. Undercut 91B has just previously been positioned radially outwardly of control port 68B fluidly connecting B recess 76B and B port 66B, and accordingly, B conduit 102, with control recess 78B and control port 68B. As the undercut 91B moves to it radially innermost position, it will connect A recess 74B and A port 64B with control recess 78B and control port 68B, and accordingly, A conduit 100. Therefore, whether chamber 92A is in fluid communication with A conduit 100 or B conduit 102 (or A' conduit 108 and B' conduit 110 associated the secondary clusters 56) depends on the positioning of undercut 91B.

For further descriptive purposes, piston assemblies 60 or 62, either of whose radial positioning controls the flow of fluid by way of a connecting control conduit 94 into and out of an adjacent chamber 92, will be referred to as a controlling piston assembly and the adjacent piston assembly 60 or 62 partially forming the adjacent chamber 92, will be known as the controlled piston assembly, with respect to one another. In FIG. 9, piston assembly 62B is the controlling piston assembly relative to piston assembly 62A which is the controlled piston assembly; the undercut 91B serving as the timing valve with respect to the flow of fluid into and out of chamber 92A.

Similar to undercut 91 of piston assembly 62, the pair of undercuts 88 and 92 of pump piston assembly 60 also function as timing valves, alternately connecting A port 64 and B port 66 of a controlling piston assembly 60 with an adjacent chamber 92 of an associated cylinder 58.

Providing sufficient pressurized fluid in the A and B conduits 100 and 102 results in pressure being applied to chambers 92 and the associated ends of bodies 84 of piston assemblies 60 or 62 to maintain roller followers 82 in contact with rotary cam 48. If a vacuum is placed across the A and B conduits 100 and 102, atmospheric pressure pushing upward upon the roller followers 82 will disengage the piston assemblies 60 or 62 from rotary cam 48. Alternatively, if the piston assemblies 60 and 62 fit tight enough within cylinders 58, the piston assemblies may stay disengaged on their own accord when pressure is released from chambers 70.

FIGS. 11A-F demonstrate a typical primary cluster 54 (or a secondary clusters 56) and piston assemblies 60 or 62 cooperating to work either as pumps or motors with rotary cam 48 rotating in either a forward or reverse direction. The hydraulic units 22, 24, 26 and 28 are reversible hydraulic units such that reversing the direction of rotation of a rotary cam 48 results in a reversal of the direction of flow through the unit; and conversely a reversal of the direction of flow through the hydraulic unit may cause a corresponding reversal in the direction of rotation.

Again, as in FIG. 9, components associated with particular cylinders 58 and piston assemblies 60 or 62 are distinguished by adding the letters A, B, C or D to the numeral identifier for the component. Also, points on lobe 50 are designated by letter A, B, C, and D. While A and B conduits 100 and 102 (or A' and B' conduits 108 and 110) are present to fluidly connect between the A and B ports 64 and 66, they are not shown in FIGS. 11A-F to simplify the drawings. Areas of fluid flow having relatively high fluid pressure are identified with the letter H and areas with relative low pressure are designated with the letter L.

Figure 11A:
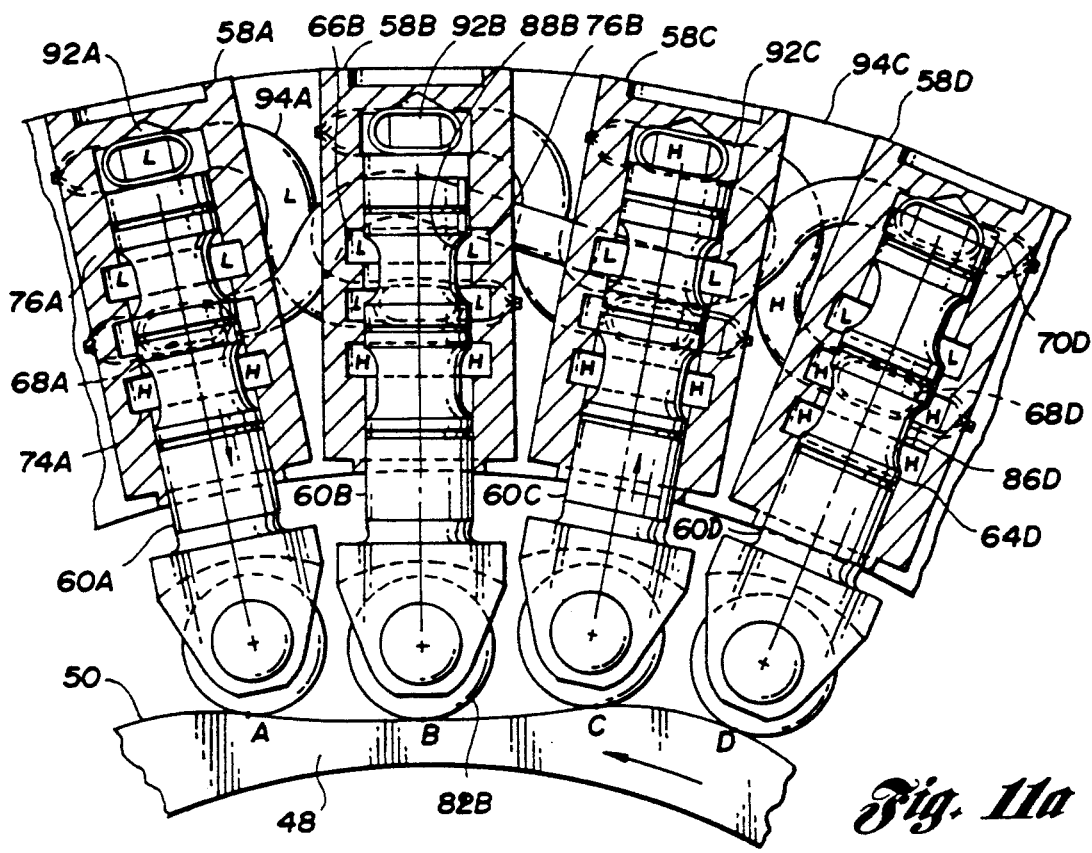
FIG. 11A is a side view of a cluster of interconnected cylinders and piston assemblies operating as a pump with a rotary cam rotating in a forward direction.

FIG. 11A shows the operation of a cluster 54 of cylinders 58 and piston assemblies 60 of hydraulic unit 22 or 24 acting as a pump. Each of the piston assemblies 60 are spaced ¼ cycle apart, each cycle being the circumferential length of one lobe 50. In the preferred embodiment there are eight lobes 50, so each piston assembly 60 is reciprocated up and down eight times in one revolution of rotary cam 48. The arced arrow on rotary cam 48 indicates the rotational direction of rotary cam 48, which in this case is counterclockwise which shall be considered the forward direction.

FIG. 11A is shown such that in hydraulic unit 22 or 24 A conduit 100 carries high pressure fluid and B conduit 102 carries low pressure fluid. Accordingly, A recesses 74 are high pressure areas and the B recesses 76 are low pressure areas in each of the cylinders 58.

Note that control conduits 94 connect between control ports 68 and chamber ports 70 on adjacent cylinders, with an extra long control conduit 94D connecting between chamber port 70D and control port 68A. Therefore, each of the piston assemblies 60 operates both as a controlling piston assembly and as a controlled piston assembly with respect to other piston assemblies in a particular cluster of four cylinders 58.

Piston assembly 60A in position A is shown moving downward as indicated by the arrow thereon. Accordingly, chamber 92A is increasing in volume and receives fluid through control conduit 94A. Piston assembly 60B is radially located such that the radially outer undercut 88B places the chamber 92A in fluid communication through control conduit 94A with the low pressure fluid of B recess 76B and B port 66B, which is connected to B conduit 102.

Piston assembly 60C is being driven radially outwardly with fluid in chamber 92C being pumped through control conduit 94C into control port 68D and reaching A conduit 100 (not shown). Piston assemblies 60B and 60D are in dwell positions B and D, i.e. moving neither up or down. Their timing valves or undercuts 88B and 88D, respectively, are instantaneously in a static position, thereby allowing low pressure fluid to flow into chamber 92A during its volume increase and directing high pressure fluid to be pumped out of the chamber 92C and into A conduit 100.

Each of the piston assemblies 60 will pass through each of the positions A-D. As they do, low pressure fluid from B conduit 102 will be pumped through the cylinders 58 and control conduits 94 into A conduit 100 to operate hydrostatic units 22 or 24 as pumps. Fluid enters B opening 106 and exits A opening 104 of hydrostatic units 22, 24, 26 and 28 relative to the remainder of system 20. It will later be explained how a plurality of spool valves is used to control this flow of high and low pressure fluid in system 20.

Figure 11B:
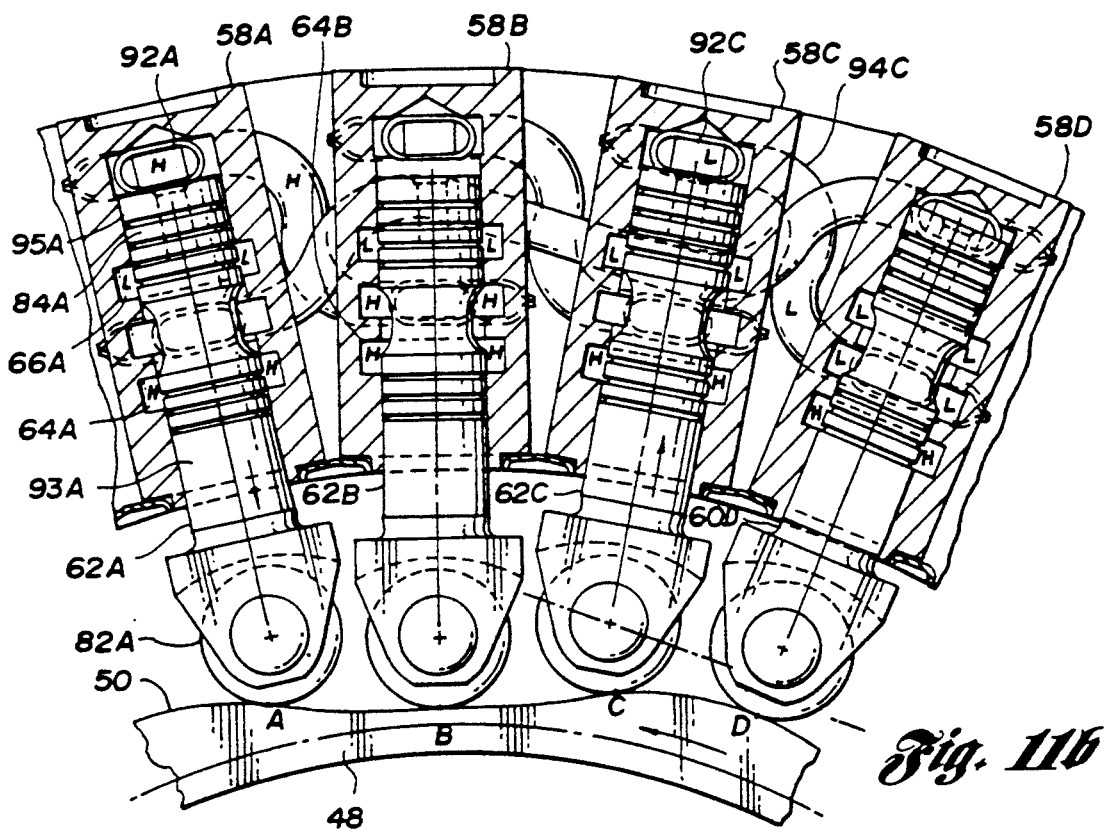
FIG. 11B is a side view of a cluster of interconnected cylinders and piston assemblies operating as a motor with the rotary cam rotating in a forward direction.

FIG. 11B shows a primary cluster 54 of cylinders 58 and piston assemblies 62 associated with hydraulic units 26 or 28. (Alternatively, it also depicts the action of the secondary clusters 56 of cylinders 58.) A conduit 100 (not shown) carries high pressure fluid and B conduit 102 carry low pressure fluid. Accordingly, A recesses 74 are designated with the letter H and B recesses 76 are designated with the letter L.

In position A, piston assembly 62A is being driven downward by high pressure fluid in chamber 92A. This results in roller follower 82A causing rotary cam 48 to rotate in a counterclockwise or forward direction as shown. Piston assembly 62B is located in a dwell position such that control port 68B is in fluid communication with A port 64B and the high pressure fluid of A conduit 100. Piston assembly 62C is being driven radially outwardly by rotary cam 48 to pump fluid from chamber 92C through control conduit 94C to control port 68D and low pressure B conduit 102. Therefore, as shown, clusters 54 operate as a motor, receiving high pressure fluid from A conduit 100 to drive rotary cam 48.

Figure 11C:
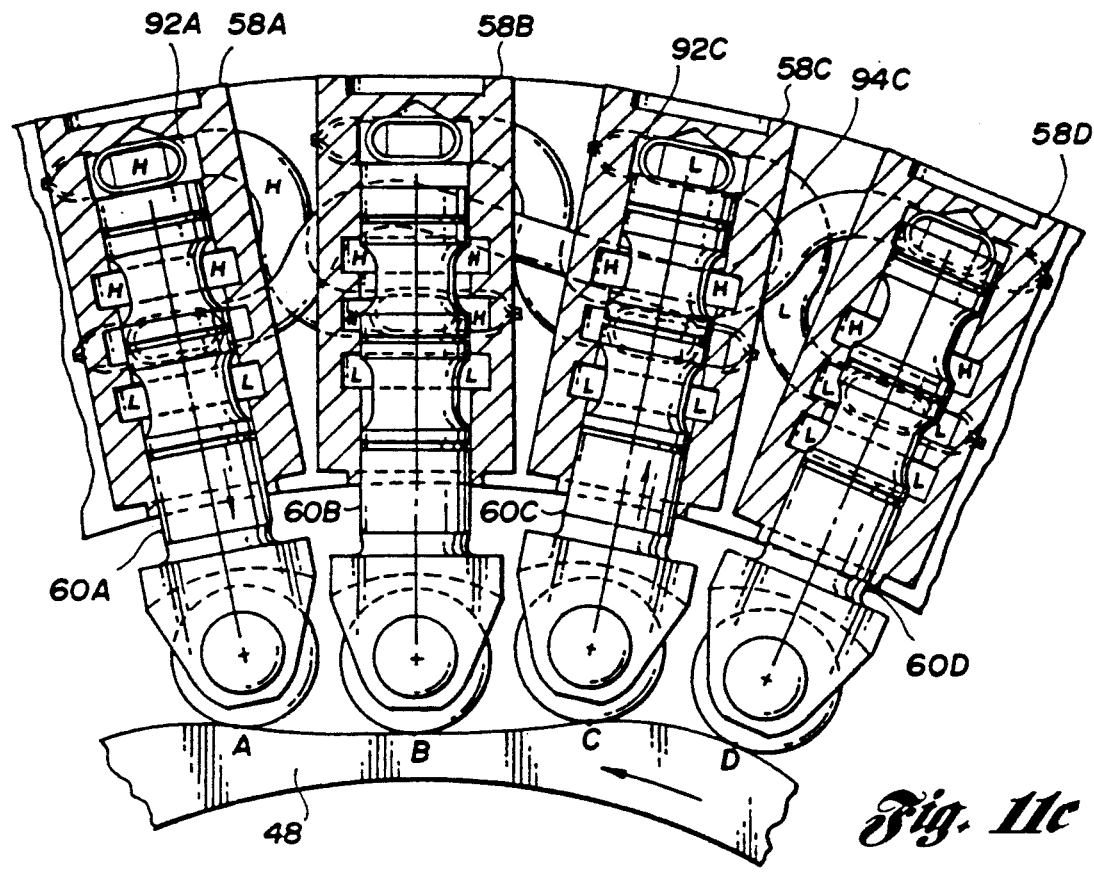
FIG. 11C shows the cluster of FIG. 11A operating as a motor with the rotary cam rotating in a forward direction.
Figure 11B:
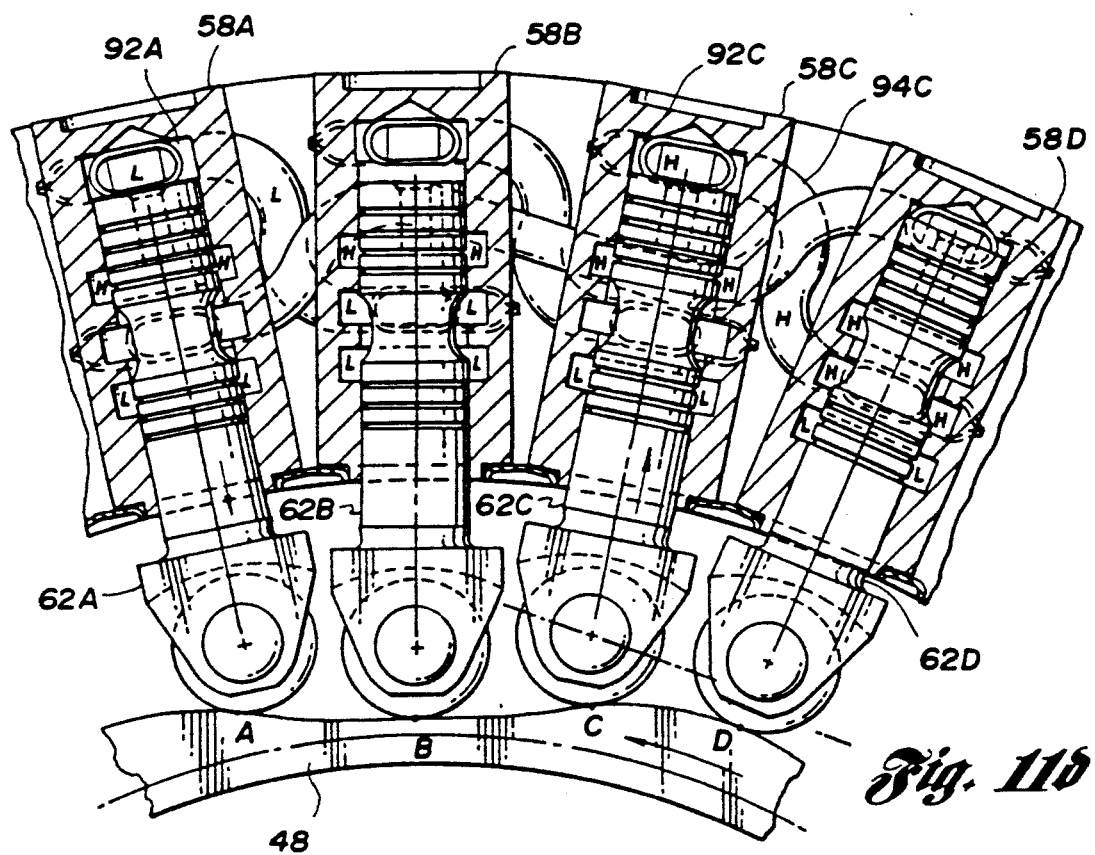

FIG. 11C shows the primary cluster 54 of cylinders 58 of FIG. 11A operating as a motor. The rotary cam 48 is again rotating in a counterclockwise or forward direction. In this case, however, A conduit 100 carries away low pressure fluid and B conduit 102 supplies high pressure fluid to the cylinders 58.

Control port 68B connects chamber 92A with high pressure fluid causing piston 62A to be driven radially downward and causing rotary cam 48 to rotate in the forward direction. Piston assembly 62C is driven radially outwardly pumping low pressure fluid out of chamber 92C to low pressure A conduit 100.

FIG. 11D illustrates the cluster 54 of FIG. 11B operating as a pump with wheels 44 or 46 turning in a forward direction. Conduit A 100 is connected with low pressure fluid and conduit B 102 is provided with a high pressure fluid from system 20. Piston assembly 62C is shown pumping high pressure fluid out of B port 66D into conduit B 102. Chamber 92A receives low pressure fluid from A port 64 and A conduit 100.

Figure 11E:
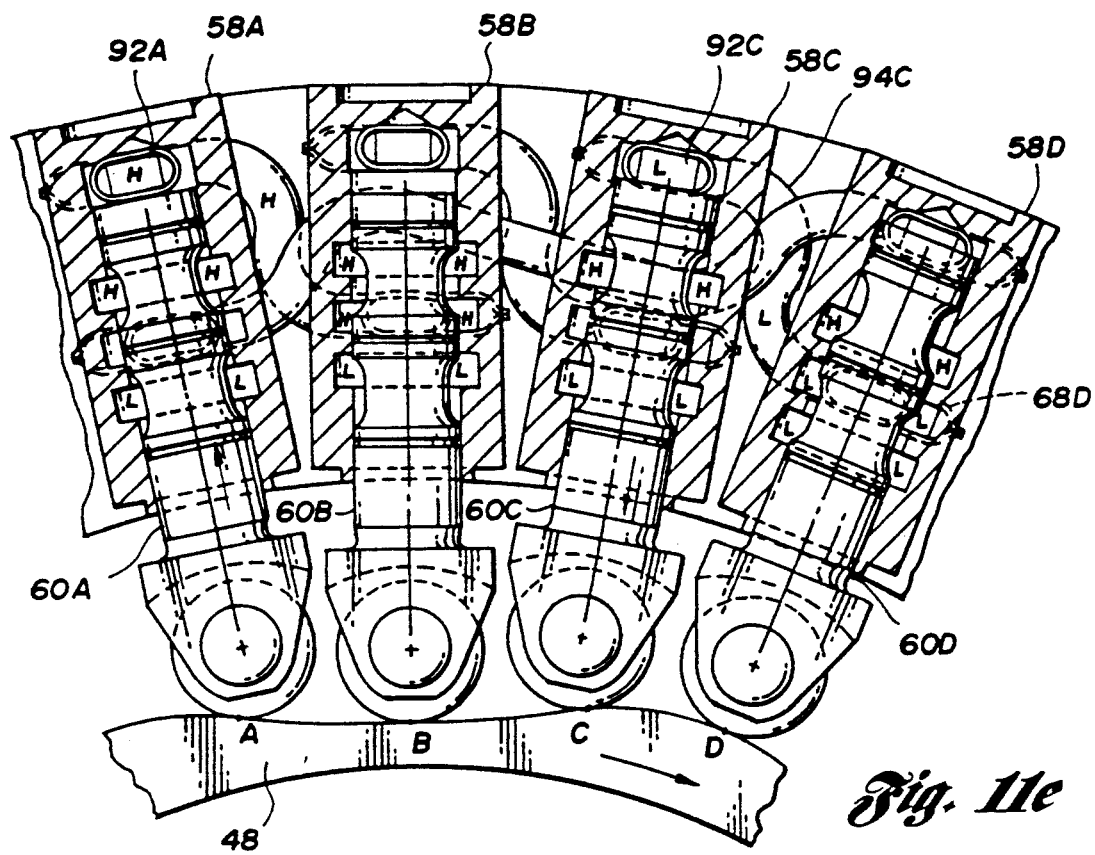
FIG. 11E shows the cluster of FIG. 11A operating as a pump with the rotary cam rotating in a reverse direction.

FIG. 11E demonstrates the primary cluster 54 of FIG. 11A operating as a pump with rotary cam 48 rotating in a reverse or clockwise direction. B port 66 receives high pressure fluid and A port 64 carries away low pressure fluid. Fluid is pumped out of chamber 92A and into high pressure B conduit 102. During the downward movement of piston assembly 62C, low pressure fluid is fed into expanding chamber 92C from A conduit 100.

Figure 11F:
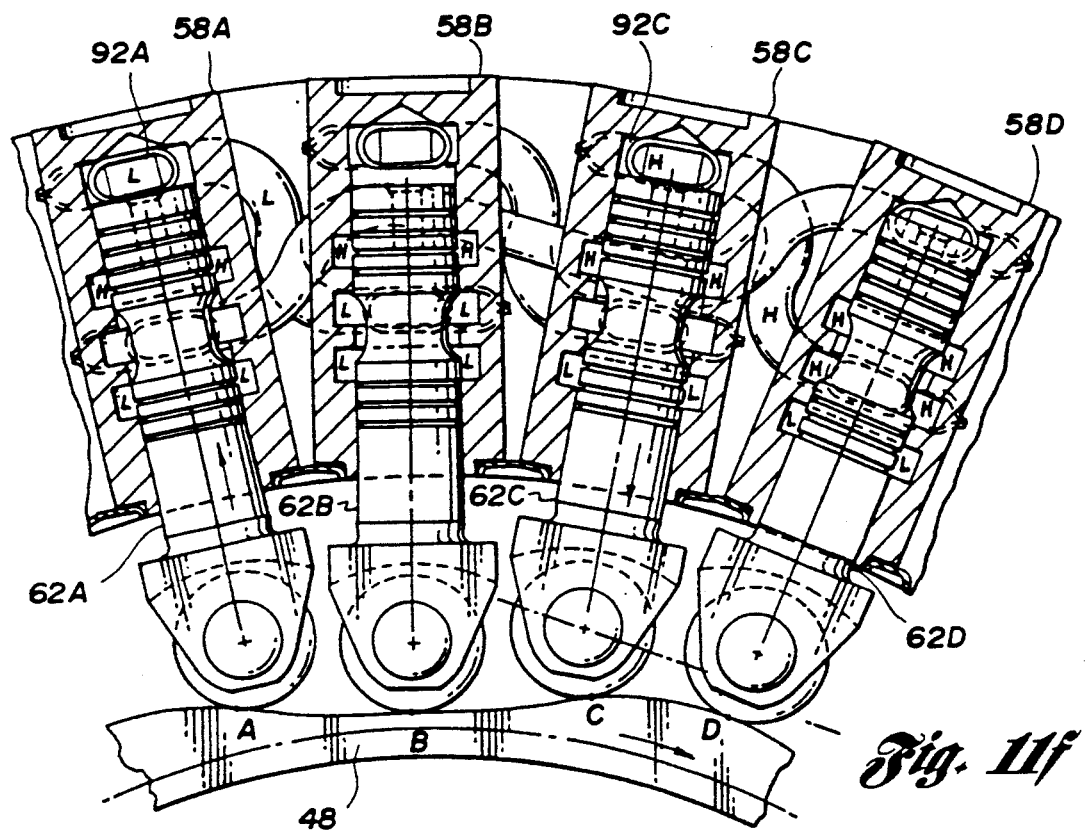
FIG. 11F shows the cluster of FIG. 11B operating as a motor with the rotary cam rotating in a reverse direction.

FIG. 11F shows the primary cluster 54 of FIG. 11B operating as a motor with rotary cam 48 rotating in a reverse direction. High pressure fluid is received from B conduit 102, passed through chambers 92, and exited into A conduit 100 (or A' conduit 108) at a substantially lower pressure. Piston assembly 62C drives rotary cam 48 with piston assembly 62A being driven outwardly by rotary cam 48 to pump low pressure fluid from chamber 92A.

B. Hydraulic Units Are Designed To Prevent Hydraulic Lock

In both pump and motor modes, the piston assemblies 60 and 62 are driven outward by the mechanical action of a follower 82 operating on the lobes 50 of the rotary cam 48. Short of mechanical failure of these components, it is not possible for the roller followers 82 to lag in timing during the outward mechanical stroke. Conversely, during the inward stroke, followers 82 are driven inwardly by pressure acting on the outer end of a piston assembly 60 or 62, and it is possible for piston assembly 60 or 62 to stick or lag behind the proper timing at any position in that portion of the inward stroke if there is not a proper balance between the friction, inertia, and hydraulic forces, resulting in separation between the follower 82 and the rotary cam 48.

In the application of the hydraulic units to vehicles, there is a preferred direction of rotation: forward for passenger cars and other on-road vehicles. It is desirable to eliminate the possibility of a damaging hydraulic lock at any forward speed. Hydraulic lock may be defined as the condition where the rotary cam 48 is trying to mechanically drive a piston assembly 60 or 62 radially outwardly but the piston assembly 60 or 62 is prevented from moving by a closed or highly restricted fluid passage. If this happens, in the absence of a pressure relief valve, the hydraulic pressure may approach infinity, with the rotation of the rotary cam 48 stopping causing the wheel to skid, or else some mechanical or hydraulic component to break.

The most critical sticking point for a piston assembly 60 or 62 is in the crossover position as its timing valve or undercut(s) 86, 88 or 91 switch from one pressure port, i.e. A port 64 or B port 66, to the other. Follower 82 is positively positioned during the outward portion of the stroke, but can possibly lag behind proper timing during the inward stroke. To minimize the possibility of hydraulic lock, it is therefore necessary that timing valve or undercuts 86 or 91 of a controlling piston assembly be in the mechanically positioned portion of the stroke when its controlled piston assembly 60 or 62 is moving outward.

By making a controlling piston assembly 60 or 62, rotating in a forward direction, lead rather than lag its controlled piston 60 or 62 by $\frac{1}{4}$ cycle, timing valve or undercuts 86 or 91 are moving outward past their crossover points when their controlled piston 60 or 62 is starting to move outward. Also, the case of a stuck controlling piston assembly 60 or 62 in the midpoint of a stroke finds the controlled piston 60 or 62 lagging ¼ cycle behind at the top of a lobe 50, having just completed the mechanically driven outward stroke, and ready to begin the hydraulically driven inward stroke. It is therefore not in a position to interfere with mechanical rotation of the rotary cam 48 even though its controlled piston 60 or 62 may be hydraulically locked at the outer extremity of its stroke by the timing valve or undercut of its controlling piston assembly 60 or 62 which is stuck or lagging.

As it not possible for a controlling piston assembly 60 or 62 to lead its controlled piston assembly 60 or 62 in both directions of rotation of the rotary cam 48, then in reverse rotation the controlling piston assembly 60 or 62 lags its controlled piston by ¼ cycle, so fail safe mechanical positioning of the timing valve or undercuts 86 or 91, relative to the controlling piston assembly 60 or 62, is not possible. See FIGS. 11E and 11F. The controlling piston assembly 60B or 62B is positioned hydraulically during its inward stroke when its controlled piston assembly 60A or 62A is starting to be driven outward by the mechanical action of the rotary cam 48.

There are at least three practical solutions which exist for acceptable reverse operation. First, a boost in piston assembly return pressure in reverse operation will increase the inward force of follower 82 against the rotary cam 48, decreasing the likelihood of a controlling piston assembly 60 or 62 sticking or lagging. This increase in operating reliability is traded off against a slight decrease in reverse operating efficiency resulting from the higher return pressure. Second, the incorporation of a pressure relief valve in each piston assembly 60 or 62, as described in U.S. Pat. No. 4,883,141, prevents failure if a controlling piston assembly 60 or 62, lags or sticks. A third possible solution is to limit speeds to a lower maximum in reverse operation.

The pump mode is distinguished by a high pressure stroke as a piston assembly 60 or 62 moves radially outward from the rotary cam 48 followed by a lower pressure return stroke as the piston assembly 60 or 62 moves radially inward. For a given operating speed, return pressure is set at a level required to maintain continuous contact of the roller follower 82 on the rotary cam 48.

The motor mode differs from the pump mode in that the outward radial movement of a piston assembly 60 or 62 is the low pressure portion of the stroke, and the inward radial movement is the high pressure portion of the stroke. To prevent hydraulic lock in forward rotation, the same requirement exists for both the pump and motor, the controlling piston assembly must lead, not lag, the controlled piston assembly by ¼ cycle. It will be seen subsequently that the piston assemblies 60 and 62 are designed differently because of the pressure differences in their hydraulic units which have a preferred pump mode and a preferred motor mode, respectively.

In a regenerative mode where energy is stored in an accumulator during vehicle deceleration and recaptured during a subsequent acceleration, each of the hydraulic units 22, 24, 26 and 28 preferably have the capability to operate, alternatively, as a pump to convert mechanical energy to hydraulic energy, and as a motor to convert hydraulic energy to mechanical energy. However, in the four wheel drive mode, where operation can be sustained for much longer periods of time, each hydraulic unit has a preferred mode, hydraulic units 22 and 24 on the mechanically driven wheels operating primarily as pumps and the hydraulic units 26 and 28 on the non-mechanically driven wheels acting primarily as motors. (The only exception is when four wheel drive is used to improve traction during vehicle deceleration or in down hill braking on an extended mountain grade.) It is therefore possible to add some design features to the components to favor the operation in the preferred mode to reduce friction and wear, to improve efficiency, and to reduce leakage.

C. Piston Assemblies Are Self-Centering

Combining the functions of a piston and a timing valve into one part brings into play some conditions not normally experienced in the two units separately: the close radial clearance and low leakage requirement of a spool valve, and the high forces and high side loading of a piston which has a roller follower operating up and down the slope of lobes of a radial cam.

In order to obtain the maximum centering of a piston assembly 60 or 62 in a bore 72, a tapered clearance space is provided between the spools and the bore, with the larger clearance at the higher pressure end. Looking to FIG. 12, a piston assembly 60 is moved sideways to counteract the force of the rotary cam 48 on the follower 82 until it contacts the bore 72 at two minimum clearance points E and F. This allows pressure to build to pressure H on the blocked sides of spools 85 and 89. The diametrically opposite side to the contacting point E provides gaps 122 and 124.

Gap 122 has a pressure gradient from a higher pressure to a lower pressure with the pressure acting on the gap side of body 84 being approximately the average of the higher and lower pressures H and L. Likewise, a gap 124 is opposite contact point F has a pressure gradient thereacross. This pressure imbalance tends to center piston assembly 60 in the bore 72 as the higher pressure on the blocked sides overpowers the lower pressure acting on the higher clearance sides which have the pressure gradients.

In order to maximize the centering of both ends of a piston assemblies 60 or 62, it is desirable to have the maximum pressure differential across each end of their spools during its maximum side loading. This means that hydraulic units 22 or 24 which operate in a pump mode during four wheel drive mode, the maximum pressure differential across the spools will be during the outward stroke of a controlled piston assembly 60 while for hydraulic units 26 and 28, having a predominant motor mode, the maximum pressure differentials will be during the inward stroke of a piston assembly 62.

Looking at piston assembly 62A, as in FIG. 11B, during the high force portion of the inward stroke, the top of body 84A adjacent the radially outer spool 95A is opposed by a high fluid pressure, and the bottom of second spool 93, which is protruding from the bore 72, has negligible pressure. In the design of the body 84 and cylinder 58, the two end spools 93 and 95 also intersect the A and B ports 64A and 66A. To maximize piston assembly 62A centering in the forward rotation, it is therefore necessary that the B port 66A, intersecting the outer spool 95A, be the low pressure port, and that the inner A port 64A, intersecting spool 93, be the high pressure port. Thus there is maximum pressure differential across the outer spool 95 and also maximum pressure differential across the inner spool 93 in forward rotation.

It is preferable to have a porting system which meets the above described lead/lag requirements to prevent hydraulic lock and which meets the pressure port requirements to maximize piston centering both for the preferred pump mode and for the preferred motor mode during forward rotation of wheels 40, 42, 44 and 46 in four wheel drive mode.

As seen in FIG. 11A, with hydraulic units 22 and 24 which have the preferred pump mode, the controlling piston assembly 60D should connect its high pressure A port 64D to chambers 92C of controlled piston assembly 60C when controlling piston assembly 60D is mechanically positioned near the outer end of its stroke and the controlled piston 60C is moving outward. Conversely, controlling piston assembly 60B should connect its low pressure B port 66B to chamber 92A of controlled piston assembly 60A when the controlling piston assembly 60B is near the inner end of its stroke and the controlled piston assembly 60A is moving inward. These requirements are accomplished with a closed center valve having three spools 85, 87 and 89 and two intervening undercuts 86 and 88.

As seen in FIG. 11B, with hydraulic units 26 and 28 which have the preferred motor mode, the leading controlling piston 62B should connect its high pressure inner A port 64B to the chamber 92A of controlled piston 62A when the controlling piston 62B is near the inner end of the stroke and the controlled piston 62A is moving inward. Conversely, the controlling piston 62D should connect its low pressure outer B port 66D to the chamber 92C of controlled piston assembly 62C when the controlling piston assembly 62D is near the outer end of the stroke and the controlled piston 62C is moving outward. These requirements are accomplished with piston assemblies 62 having the two spools 93 and 95 and undercut 91.

If the self-centering feature of the piston assemblies is not used, i.e., bodies 84 are not tapered, then either of piston assemblies 60 or 62 may be used with all of the hydraulic units. Preferably, piston assembly 62 is used as it contains more labyrinth grooves than does piston assembly 60.

D. Casting of Lightweight Metal About Inserts

FIG. 5 show insert 55. Insert 55 is comprised of primary and secondary clusters 54 and 56 of cylinders 58, control conduits 94 connecting cylinders 58 of the clusters, A and B conduits 100 and 102, A' and B' conduits 108, 110, air vent conduit 116, scavenge conduit 119 and collar plate 117. Cylinders 58 are preferably made of steel or cast iron. The aforementioned conduits are preferably made of steel.

Figure 16A:
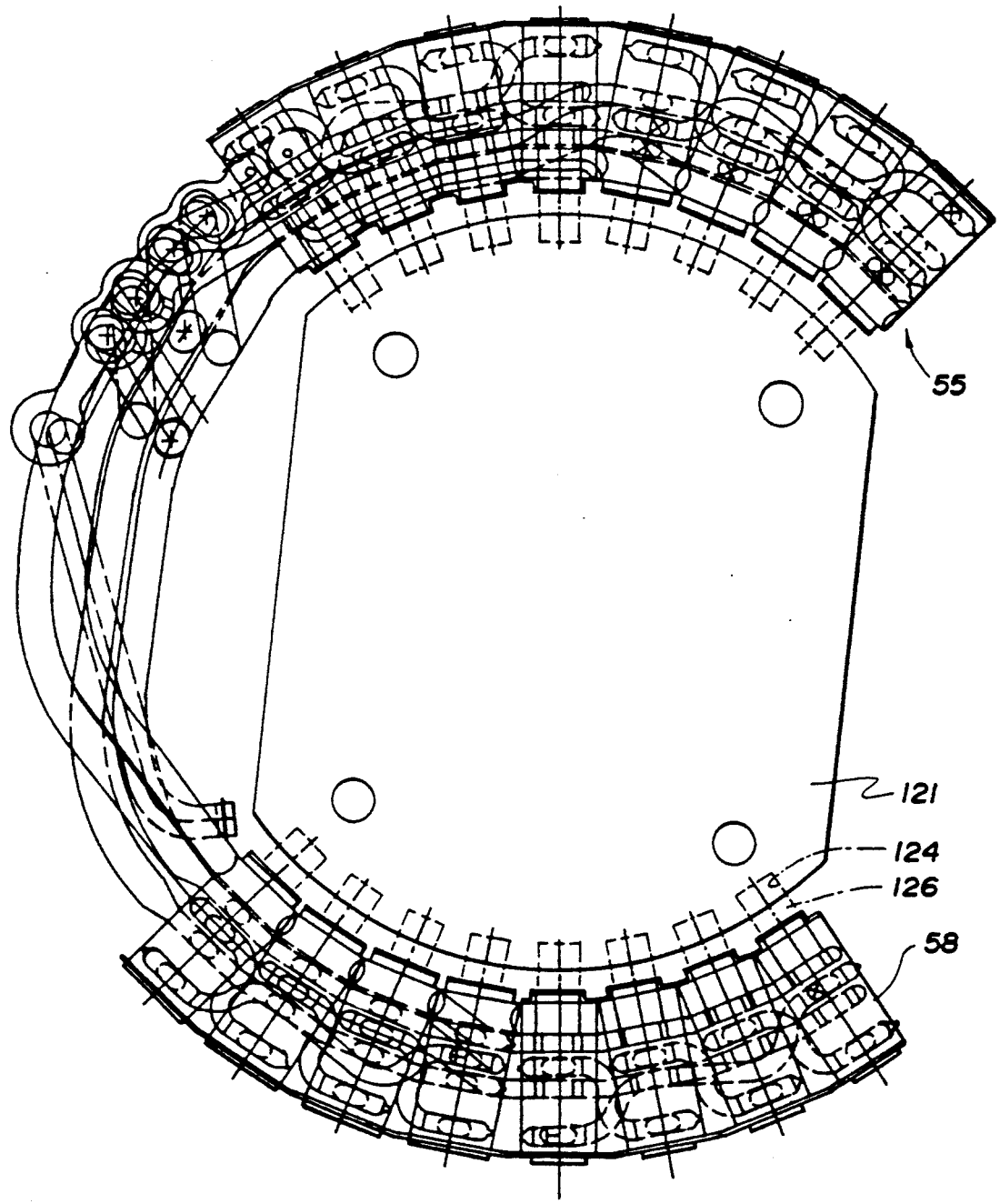
FIG. 16A is side view of a pair of fixturing plates and dowels circumaxially positioning cylinders.
Figure 16B:
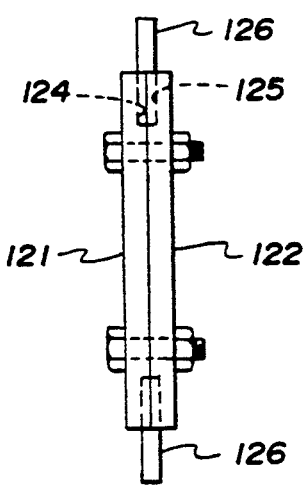
FIG. 16B is a front view of the fixturing plate.

Looking to FIG. 16A and FIG. 16B, first and second locating plates 122 and 123 have circumaxially spaced half-cylinder apertures 124 and 125 which cooperate to secure dowels 126. Bolts are used to releasably hold the plates together. Cylinders 58 are mounted on the free ends of dowels 125.

Conduits A 100, B 102, A' 106 and B' 108, air vent 116, and scavenge 119 and control conduits 94, collar plate 117 and cylinders 58 are then brazed together and are pressure tested for leaks or weak joints. The ends of the conduits surrounded by collar plate 117 extend therethrough a few inches.

The insert 55 is placed into a mold and a lightweight metal, preferably aluminum or magnesium, is poured thereabout to form casting 57 of stationary member 53. The positioning plates 122 and 123 are unbolted and separated with dowels 126 being removed from the cylinders 125. The ends of the exposed conduits A 100, B 102, air vent 115, A' 110, B' 112 and scavenge 119 extending through collar plate 117 are cut off. The collar plate 117 is then machined smooth with casting 57. In a similar fashion, the casting 57 of stationary member 52, surrounding its conduits A 100, B 102, scavenge conduit 119, and air vent conduit 116, is formed.

Figure 17A:
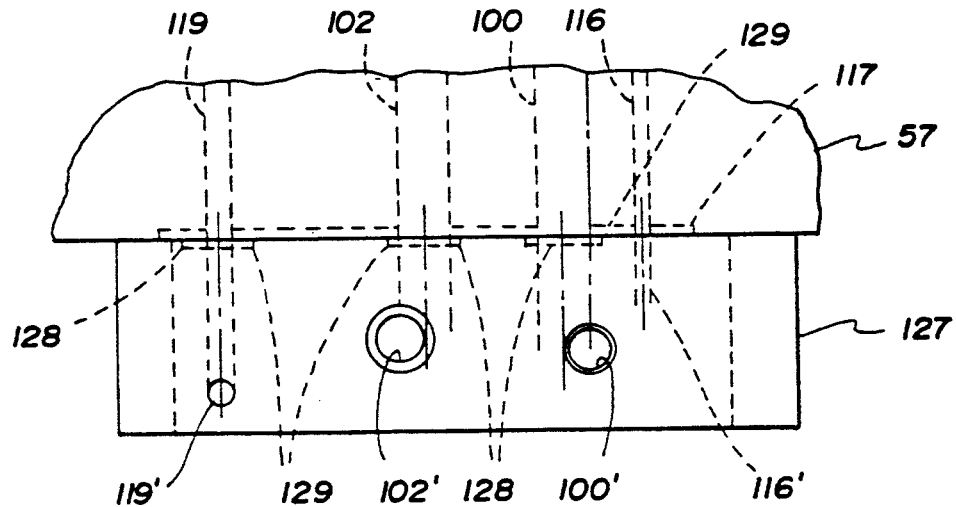
FIG. 17A a top view of a valve body securing to a collar plate and casting.

FIG. 17A is a top view a valve body 127 attaching to a casting 57. Collar plate 117 is shown after it has been machined flush with the outer surface of casting 57. Valve body 127 has a plurality of recesses 128 sized to receive elastomeric O-rings 129. The O-rings 129 are thicker than the depth of recesses 128 so that the mounting, preferably by bolt, of valve body 127 to casting 57 will provide a fluid-tight seal between valve body 127 and casting 57. Consequently, fluid may pass from the A conduit 100, B conduit 102, air vent conduit 116 and scavenge conduit 119 to corresponding conduits 100', 102' 116' and 119' in valve body 127. The collar plate 117 prevents high pressure fluid from escaping through porosities in casting 57.

Figure 17B:
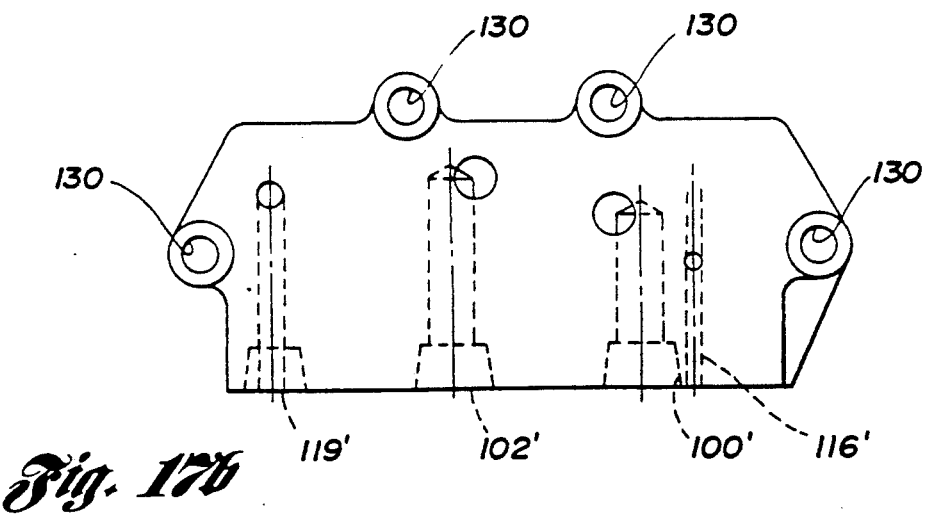
FIG. 17B shows a side view of the valve body.

FIG. 17B shows a side view of valve body 127. Four apertures 130 are provided for receiving bolts to attached to tapped apertures (not shown) in casting 57. With casting 57 of stationary member 53, valve body 127 would be provided with additional passageways 108' and 110' (not shown) to accommodate A' and B' conduits 108' and 110'.

Stationary members 52 or 53, and in particular their casting 57, is adapted to fit around a brake caliper when stationary members 52 or 53 is placed on a vehicle. The casting 57, as seen in FIG. 4 with respect to one of the front hydraulic units 22, is closed circumferentially for rigidity and strength rather than being an open C-shaped member similar to casting 55.

Figure 10:
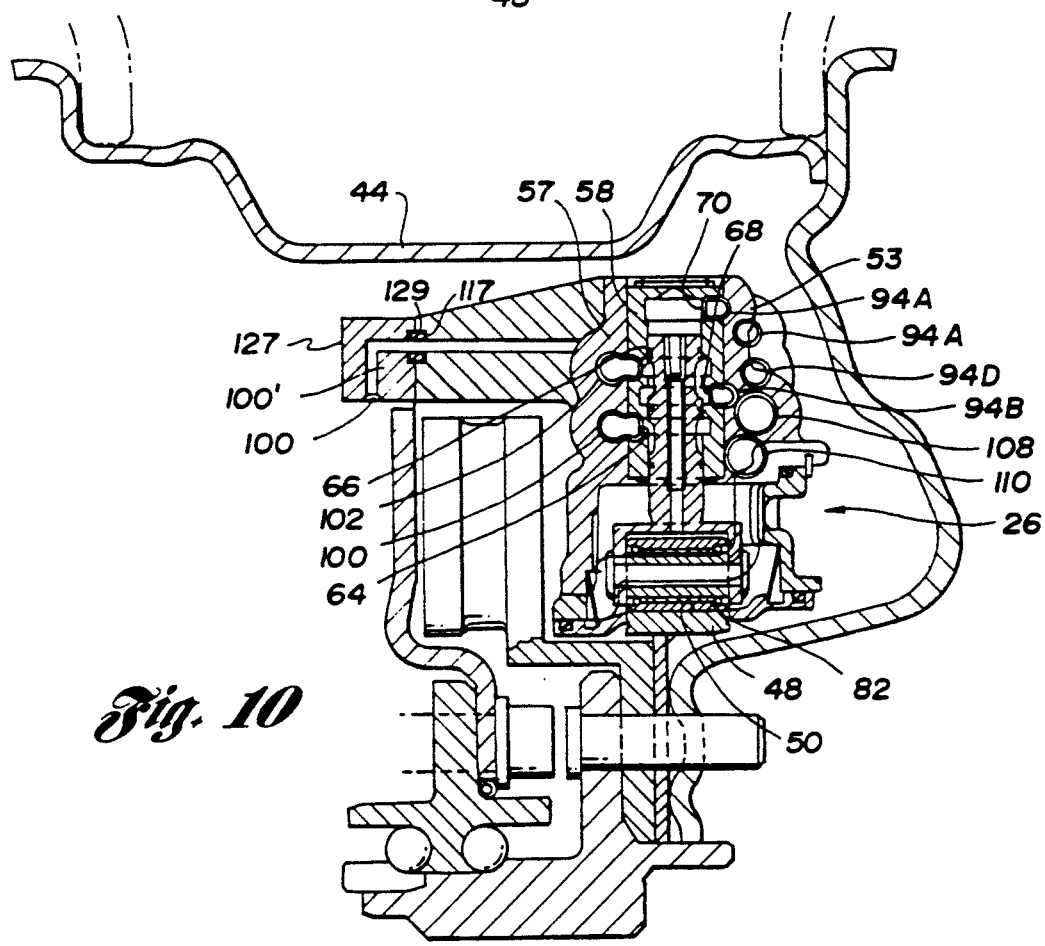
FIG. 10 is a schematic sectional view of a hydraulic unit including seals.

FIG. 10 shows a cross-section of hydraulic unit 26 mounted to wheel 44 with casting 57 enclosing insert 55. Rotary cam 48 is affixed to rotate with wheel 44 and stationary member 53 is secured to vehicle 30. Follower 82 is engaged with the outer radial surface of lobe 50. A and B conduits 100 and 102 are shown connecting with A and B ports 64 and 66. Also, chamber port 70 and control port 68 are shown to be in communication, respectively, with the upper and lower sections of control conduit 94A and control conduit 94B.

Casting 57 is shown configured to fit between wheel 44 and a brake caliper. Also, valve body 127 is shown attached to casting 57.

Figure 14:
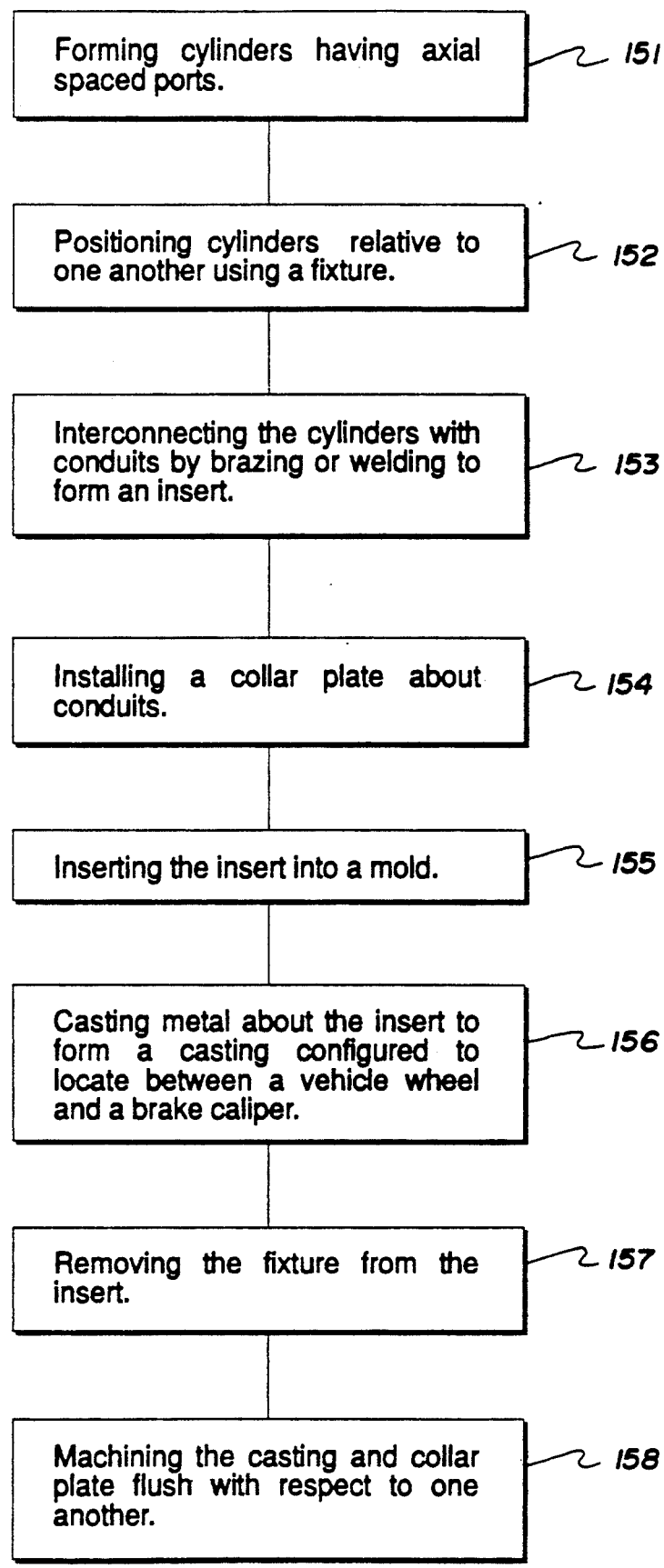
FIG. 14 is a schematic diagram showing steps taken in a method of forming a casting surrounding an insert.

FIG. 14 summarizes the steps taken in manufacturing insert 55 and casting 57. The first step 151 is forming cylinders 58 which have axial spaced ports, namely A port 64, B port 66, control port 68 and chamber port 70. In step 152 the cylinders 58 are placed upon the positioning dowels 126 which are held by first and second positioning plates 122 and 123.

Step 153 includes interconnecting A conduit 100, B conduit 102, and control conduits 94 by brazing or welding to the A ports 64, B ports 66 and between control ports 68 and chamber ports 70 of cylinders 58 to form an insert 55. Likewise, scavenge conduit 119 and air vent conduit 116 are brazed to the other conduits and cylinders. Step 154 is installing a collar plate about A conduit 100, B conduit 102, air vent conduit 116 and scavenge conduit 119. Step 155 includes placing the insert 55 in a mold. Step 156 is casting metal about insert 55 to form casting 57 which is configured to locate between a vehicle wheel and brake caliper. Step 157 is removing the fixture of first and second positioning plates 122 and 123 and their dowels 126 from cylinders 58. Finally, step 158 provides machining the collar plate flush with respect to the casting 57 with respect to one another.

E. Sealing Mechanism Between Rotary Cam And Stationary Member

FIG. 15 is an enlarged view of the sealing mechanism shown in FIG. 10. Stationary member 53 is shown sealing with respect to rotary cam 48. Stationary member 52 seals with rotary cam 48 in a similar fashion. Rotary cam 48 has a web portion 130 with lobes 50 being a wide flange. Laterally spaced sides 131 and 132 of lobe 50 are stepped, forming respectively, smooth seal faces 133 and 134 thereon.

Stationary member 52 includes casting 57 and a cover plate 135 which have respective flanges 136 and 137. The cover plate 135 is held in place by a snap ring (not shown). Laterally extending seal members 138 and 139, preferably made of chrome oxide ceramic, have first grooves 140 and 141 retaining annular seals 142 and 143, respectively. Seals 142 and 143 are preferably U-shaped lipseals with coil spring energizers and provide circumferential radial sealing between flanges 140 and 141 and seal members 138 and 139.

Seal members 138 and 139 are biased laterally inwardly by springs 144 and 145, which are similar to belleville washers. Springs 144 and 145 are compressed between flanges 136 and 137 and second grooves 146 and 147 in seal members 138 and 139. Seal members 138 and 139 have seal faces 148 and 149 which abut and seal with seal faces 133 and 134 of rotary cam 48. As seal faces 133, 134, 148 and 149 wear down, springs 144 and 145 maintain their engagement.

A scavenge chamber 150 is defined by flanges 136 and 137, lobes 50 of rotary cam 48, and seal members 140 and 142. Scavenge chamber 150 extends circumferentially sufficiently to encompass all of the roller followers 82. Similarly, seal members 138 and 140 and springs 144 and 145 extend approximately 270 degrees. Seals 142 and 143 extend 360 degrees.

Fluid leaking through opening 80 on cylinders 58 are captured in scavenge chamber 123. Preferably, a vacuum is placed across scavenge conduit 119 to keep scavenge chamber 150 evacuated. Air vent conduit 116 supplies air to scavenge chamber 150.

III. Filter Assemblies

Figure 18A:
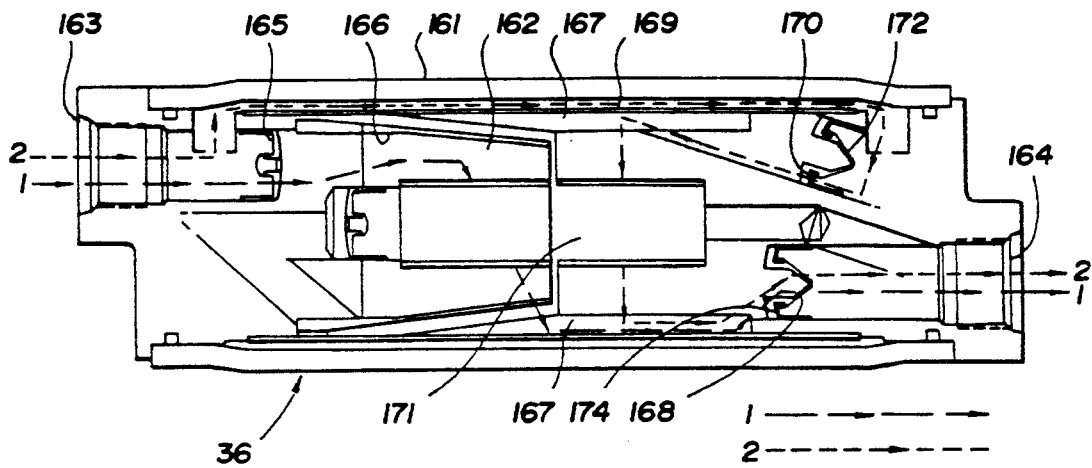
FIG. 18A is a schematic diagram showing the flow of fluid through a filter assembly in a first direction in unblocked (——→——) and blocked conditions (—>—)
Figure 18B:
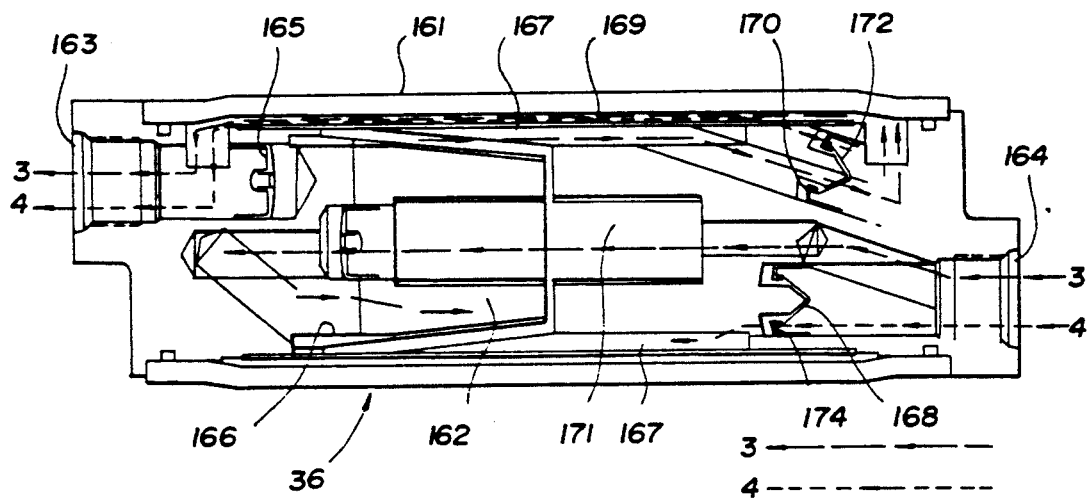
FIG. 18B is a schematic diagram wherein fluid flows through the filter assembly in an opposite second direction in unblocked (——→——) and blocked conditions (—>—)
Figures 21A, 21B, 21C:
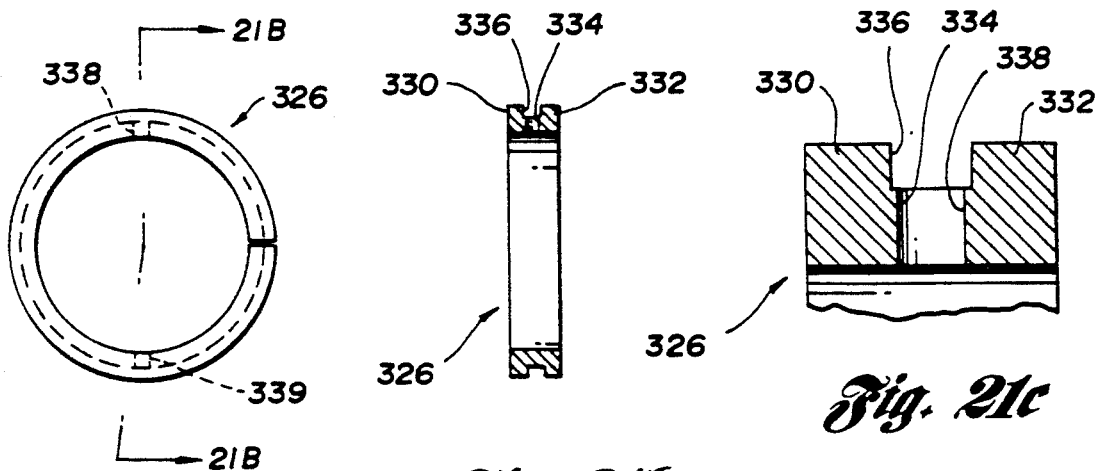
Figure 21B:
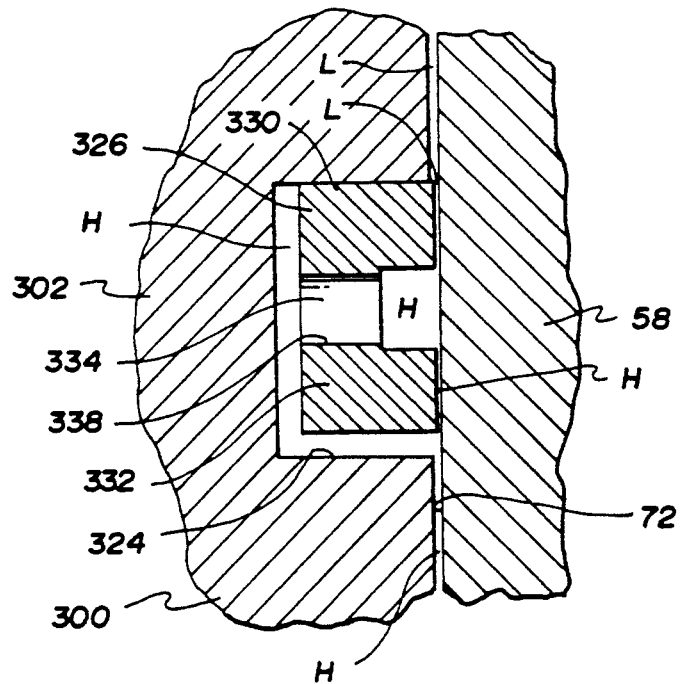

Filter assemblies 44, as shown in FIG. 1, are placed on passageways leading to hydraulic units to prevent contaminants from reaching the hydraulic units. FIGS. 18A and 18B show one of the filter assemblies 44 used to filter the fluid flowing through system 20. Filter assembly 44 has a cylindrical housing 161 holding a plurality of valves and a filter element 162. Fluid may enter a first port 163 and exit a second port 164, or vice versa, depending on direction of fluid flow in the system 20. Regardless of the direction of flow, the fluid is allowed to pass through unblocked filter element 162 in only a single direction. This prevents the back flushing of contaminants from filter element 162.

FIG. 18A shows fluid flowing through filter assembly 36 in a first direction along a path 1 with filter element 162 in an unblocked state and along path 2 in a blocked state. Along path 1, fluid enters a first port 163, passes to a first umbrella valve 165 and to a filter chamber 166, which holds filter element 162 preferably a cone screen filter. In the preferred embodiment, umbrella valve 165 is model VA3405, sold by Vernay Laboratories of Dayton, Ohio. Fluid passes radially outwardly through unblocked filter element 162 into an annular receiving chamber 167 and through a first one-way V-shaped duckbill valve 168 and out of filter assembly 36 through second port 164.

If filter element 162 is clogged or blocked, fluid follows path 2 through first port 163, into an outer chamber 169, and through a combination valve 170 into receiving chamber 167, thereby bypassing filter element 162. Combination valve 165 includes a valve similar to a rubber belleville valve and is preferably Vernay Laboratory Model No. VA3581, which requires a 10 psi pressure differential to open. Fluid passes from receiving chamber 167 through first duckbull valve 168 and out second port 164.

If the flow of fluid to filter assembly 36 is reversed, then unblocked path 3 and blocked path 4 are followed as shown in FIG. 18B. Along path 3, fluid will enter second port 164, pass into a center chamber 171 and then to filter chamber 166 and through unblocked filter element 162. The fluid is received into receiving chamber 167, passes through a second duckbill valve 172 into outer chamber 166 and out of filter assembly 36 through first port 163.

If the filter element 162 is blocked, path 4 is followed with fluid flowing through a second combination valve 174, also preferably model VA3581, into receiving chamber 167, through second duckbill valve 172 to outer chamber 169 and out first port 163. Again, fluid will bypass filter element 162.

Operation of Hydraulic Regenerative Braking System

A. Overview

FIG. 1 is a schematic illustration of the operation of the hydraulic regenerative braking and four wheel drive system 20. A pair of mode spool valves 32 and 33 control whether the hydraulic units 22, 24, 26 and 28 are in a four wheel drive mode or in a regenerative mode. Regenerative spool valve 34 controls, when mode spool valves 32 and 33 are selectively positioned to the regenerative mode, whether the hydraulic units 22, 24, 26 and 28 act as pumps in a pump mode to assist in deceleration and energy storage or as motors in a motor mode to assist in acceleration using stored energy. On/off spool valve 35 controls whether system 20 is operative or not, i.e., whether piston assemblies 60 or 62 are in engagement with rotary cams 48 in the hydraulic units 22, 24, 26 and 28.

Other components of system 20 include threshold valves 187, vacuum pump 188 which is connected to a vacuum reservoir 37, low select valves 189, a charging pump 192, storage reservoir 37 and a fluid accumulator 30. These components are interconnected with the hydraulic units 22, 24, 26, and 28 through the aforementioned spool valves 32, 33, 34 and 35 through a series of passageways as will now be described.

B. Mode Spool Valve Controls Four-Wheel Drive Mode And Regenerative Mode

Mode spool valve 32 has spools 200, 202 and 204 with undercuts 206 and 208 disposed therebetween. Similarly, mode spool valve 33 has spools 210, 212, and 214 with undercuts 216 and 218 located therebetween. Passageways A1 and B1, respectively, are connected to the A and B conduits 100' and 102' of valve body 127 of hydraulic units 22. (The valve bodies 127 of the hydraulic units are not shown in FIG. 1). Scavenge conduit 119' on each of the hydraulic units is connected to passageway J.

Passageways A and B on hydraulic unit 26, respectively, are connected to A and A' conduits 100' and 106' and B and B' conduits 102' and 108' of its valve body 127. Whether the A' and B' conduits 106 and 108 will receive fluid is dependent upon whether additional torque need be applied to the rear wheels 44 and 46. Threshold valves 187 control whether A' and B' conduits and, accordingly, the secondary clusters 56 are engaged. If fluid of sufficient pressure is provided to threshold valves 187, the A and A' conduits and B and B' conduits will be fluidly connected. A threshold valve is described in U.S. Pat. No. 4,883,141. When front wheels 40 and 42 rotate faster than back wheels 44 and 46, as when the front wheels slide or spin on ice, fluid pressure in the passageways rises opening the threshold valves 187 and engaging the secondary cluster 56 of cylinders 58 to provide additional torque. This assumes hydraulic units 22, 24, 26 and 28 have approximately the same volumetric capacity in their primary clusters 54 of cylinders 58.

The valve bodies 127 of hydraulic units 24 and 28 are connected to passageways A1 and B1 and passageways A, A', B and B' as described above.

Spool valves 32 and 33 are shown selectively positioned in an up position which places the hydraulic units 22, 24, 26 and 28 into the four wheel drive mode. Note that passageways A1 and B1, respectively, are connected to passageways A and B by undercuts 208 and 218. Preferably the diagonally disposed hydraulic units 22 and 28 are connected together as are hydraulic units 24 and 26.

Therefore, if high pressure fluid passes through passageways A and A1 and low pressure fluid passes through passageways B and B1, and the wheels are rotating forwardly, the hydraulic units 22, 24, 26, and 28 will be in the state depicted in FIGS. 11A and 11B. That is, hydraulic units 22 and 24 operate as pumps to transfer high pressure fluid to hydraulic units 26 and 28 which act as motors. Low pressure fluid is transferred from hydraulic units 26 and 28 to hydraulic units 24 and 22 for further pumping. Therefore, all four wheels 40, 42, 44 and 46 are driven. In the event extra torque is needed at the rear wheels 44 and 46, again the secondary clusters 56 of cylinders 58 may be activated by transferring fluid through A' and B' conduits 106 and 108.

If mode spool valves 32 and 33 are placed in a down position, the hydraulic units 22, 24, 26 and 28 will all act as either pumps or motors, depending the selected position of regenerative spool valve 42. Passageways C and D connect between mode spool valves 32 and 33 and regenerative spool valve 34. The full length of passageways C and D are not shown to simplify FIG. 1.

In the down position, undercuts 206 and 208 of spool valve 40 will connect passageways A1 and B with passageways D and passageways A and B1 with passageways C. Therefore, if high pressure fluid is delivered from passageways D to passageways A and B1, and low pressure fluid from passageways A1 and B is carried away by passageways C, the hydraulic units 22, 24, 26 and 28 will all act as motors, as shown in FIGS. 11B and 11C when the wheels rotate forwardly. Conversely, if high pressure fluid is delivered from passageways C to passageways A and B1 and low pressure fluid carried away from passageways B and A1 by passageway D, the hydraulic units 22, 24, 26, and 28 will operate as pumps. See FIGS. 11A and 11D. Alternatively, vehicle 30 may driven in a reverse direction and the direction of fluid flow and operation of hydraulics units 22, 24, 26 and 28 as either pumps or motors may also be controlled by spool valve 34.

Accumulator 30 is connected by way of accumulator passageway E to bifurcated passageways F and G and regenerative spool valve 34. Accumulator 30 is preferably of a variable volume bladder type although other types of accumulators may also be used to store pressurized fluid and its associated energy.

C. Regenerative Spool Valve Controls Acceleration or Deceleration Mode

Regenerative spool valve 34 has spools 220, 222 and 224 and undercuts 226 and 228. As shown, regenerative spool valve 42 is an up position or acceleration mode. Therefore, high pressure fluid from accumulator 30 and passageway F is received in undercut 226 and transferred by passageway C to passageways A and B1 to operate the hydraulic units 22, 24, 26 and 28 as motors. Fluid exiting from the hydraulic units 22, 24, 26 and 28 by passageways A1 and B and passageway D reaches undercut 228 and a passageway H. passageway G is blocked by spool 224.

Regenerative spool valve 42 may be selectively positioned downwardly into a deceleration mode where fluid is pumped under pressure to accumulator 30. High pressure fluid is pumped from hydraulic units 22, 24, 26, and 28 through passageways A1 and B to passageway D to reach undercut 228. The high pressure fluid is then passed through passageway G and E to accumulator 30. Low pressure fluid from passageway H proceeds through undercut 226 and passageway C to passageways A and B1 to supply hydraulic units 22, 24, 26, and 28.

Note that when mode spool valves 32 and 33 are in the up position or regenerative mode, passageways C and D are isolated from passageways A, A1, B and B1. Therefore, unless the regenerative mode is to be used, mode spool valves 32 and 33 are kept in an up position to prevent fluid leakage from accumulator 30.

D. On/Off Spool Valve Controls Flow of Fluid To And Engagement of Hydraulic Units On/off spool valve 35 controls whether system 20 is engaged or disengaged. With on/off spool valve 35 positioned in an up position, system 20 will disengage. In a down position as shown, on/off spool valve 35 fluidly connects vacuum reservoir 37 and storage reservoir 37 to the remainder of system 20.

Preventing fluid from reaching the hydrostatic units 22, 24, 26 and 28 will result in disengagement of the piston assemblies 60 or 62 from rotary cams 48. Mode spool valves 32 and 33 are positioned upwardly, or in the four wheel drive mode, to isolate the hydraulic units 22, 24, 26 or 28 from regenerative spool valve 42 and accumulator 30. As just described, placing on/off spool valve 35 in the off position will allow fluid to escape into the vacuum reservoir 37.

Hydraulic units 22, 24, 26 and 28 lose pressurized fluid through seepage to scavenge chamber or else back through on/off spool valve 35. In an up or off position, spool valve 35 allows fluid to return to vacuum reservoir 37 through passageways M and K. Therefore, chambers 92 will no longer have pressurized fluid to return the piston assemblies 60 and 62 to engagement with rotary cams 48 when sufficient fluid has been exhausted from the hydraulic units 22, 24, 26 or 28. Passageway J connects vacuum reservoir 37 to the scavenge conduit 119' in each of the hydraulic units 22, 24, 26 and 28. Vacuum pump 188 operates whenever the system 20 is engaged to keep scavenge chamber 123 evacuated.

Friction between the pistons assemblies 60 or 62 and the bores of cylinders 58 have been found to be sufficient to keep the piston assemblies 60 or 62 disengaged from rotary cam 48. Additionally, as described in U.S. Pat. No. 4,883,141, a vacuum could be placed across the hydraulic units to keep the piston assemblies 60 and 62 disengaged. However, in the preferred embodiment, this has not been found to be necessary.

Charging pump 192 is turned on when fluid is to be injected to the hydraulic units 22, 24, 26, and 28 from the reservoirs. Passageway K connects vacuum reservoir 37 to the charging pump 192 and passageway L connects storage reservoir 37 to the charging pump 192. Maintaining storage reservoir 37 at greater than a certain minimum pressure, i.e. 200 psi, will insure a ready supply of fluid to activate system 20.

As shown, on/off spool valve 35 is in a down or on position activating system 20. In the down position, pressurized fluid is supplied to or retrieved from passageway H or I. If the system 20 is to be placed into the four wheel drive mode, mode spool valves 32 and 33 are selectively positioned upwardly to interconnect the hydraulic units 22, 24, 26 and 28 into the four wheel drive mode. Fluid from storage reservoir 37 passes through on/off spool valve 35 and passageway H to reach the low select valves 189 associated with each of hydraulic units 26 and 28. Low select valves 189 connect passageway I with whichever of passageway A or B which has the lower pressure. Again, a low select valve is described in U.S. Pat. No. 4,883,141. The pressurized fluid enters hydraulic units 26 and 28 filling their chambers 92 and eventually reaching the other hydraulic units 22 and 26, causing the rear wheels 44 and 46 rotate with the front wheels 40 and 42.

Alternatively, if vehicle 30 is to be decelerated and energy stored, regenerative spool valve 34 is positioned downwardly into the deceleration mode and mode spool valves 32 and 33 are positioned downwardly into the regenerative mode. Regeneration spool valve 34 is positioned downwardly into the deceleration mode. Fluid from reservoir 37 passes through reservoir spool valve 35 to reach passageway H and I to eventually reach the hydraulic units 22, 24, 26 and 28. Again, the system 20 is quickly filled with fluid and the hydraulic units 22, 24, 26 and 28 will engage.

If vehicle 30 is to be accelerated, regenerative spool 42 is instead positioned upwardly with mode spool valves being in their downward position. Also, pump 192 is deactivated to allow fluid to return to storage reservoir 37.

High pressure fluid travels from accumulator 30 through passageways E and F to reach regenerative spool valve 34. Fluid then travels through passageway C to hydraulic units 22, 24, 26 and 28 and returns in passageway D to regenerative spool valve 34. The now low pressure fluid travels through passageway H to reservoir spool valve 35 and storage reservoir 237.

V. Alternative Designs for Piston Assemblies and Sealing Mechanisms

A. Alternative Piston Assembly Design

FIGS. 19 and 20 illustrate an alternative embodiment of a piston assembly 300 and a cluster of piston assemblies 300A-D located in cylinders 58A-D. Piston assembly 300 includes a body 302 and a follower assembly 304. Body 302 has upper and lower internal passages 306 and 308. Upper passage 306 includes upper transverse portion 310, vertical portion 312, and lower transverse portion 314. Similarly, lower passage 308 encompasses upper transverse portion 316, vertical portion 318 and lower portion 320. Preferably, each of these portions is comprised of a pair of drilled or milled holes. Alternatively, single drilled or milled holes of a larger diameter can be used. The holes forming vertical portions 312 and 318, which extend generally parallel to the longitudinal axis of body 302, are sealed with pairs of end plugs 322 and 323.

As piston assembly 300 reciprocates within cylinder 58, upper and lower passages 306 and 308 alternately fluidly connect B port 66 and A port 64 to control port 68 in a manner similar to that of undercuts 86 and 88 of piston assembly 60 which has previously been described. However, in this case fluid passes internally through body 302 of piston assembly 300 rather than externally to body 84 of piston assembly 60 when travelling between respective A port 64 and B port 66 and control port 68 of cylinder 58.

Piston body 302 has four circumferentially extending seal recesses 324, each of which has a seal ring 326 located therein. Seal recesses 324 are longitudinally disposed along body 302 so that seal rings 326 located therein may slide along the smooth portions of inner bore 72 of cylinder 58 as piston assembly 302 reciprocates. Seal rings 326 are arranged to sandwich about A port 64, control port 68 and B port 66. Consequently, there is little leakage of fluid between adjacent ports as piston assembly 300 reciprocates in cylinder 58.

FIGS. 21A-D illustrate a seal ring 326. Seal ring 326 is C-shaped in cross-section having a first segment 330, a second segment 332 spaced therefrom and a connecting intermediate bight segment 334 which define an annular channel 336 in the outer diameter of seal ring 326. A pair of diametrically opposed and radially extending apertures 338 are located in bight segment 334. Apertures 338 allow fluid to freely flow between the inner and outer diameters of seal ring 326. Preferably, segments 330 and 332 are equal in size with seal ring 326 being symmetrical. Seal ring 326 is designed to be sufficiently wide such that it cannot be received within any of annular recesses 74, 76 or 78 located in bore 72 of cylinder 58 when body 302 is inserted into bore 72. Seal ring 326 is preferably made of Teflon and is stretched to pass over the outer diameter of body 302 prior to being received into seal recess 324. A sizing ring may then be used to compress stretched seal ring 326 when in seal recess 324.

Due to the design of seal ring 326, only one of first or second segments 330 or 332 seals between body 302 and bore 72 of cylinder 58. FIG. 22D shows seal ring 326 located in seal recess 324. Fluid escaping from high pressure and low pressure ports, located on either side of seal ring 326, escape into the diametrical clearance spaces between body 302 and cylinder 58. Clearance spaces containing high pressure fluid are designated with the letter "H" and those areas containing low pressure fluid are identified with the letter "L".

As shown, only segment 330 will seal between body 302 and cylinder 58. Segment 332 and bight segment 334 will be surrounded by high pressure fluid and will essentially float in this high pressure fluid. This, in part, is due to the fluid freely passing through apertures 338. The high pressure fluid pressing on the inner diameter of segment 330 will overcome the lower pressure fluid pressing on the outer diameter resulting in segment 330 sealing between cylinder 58 and body 302.

Without apertures 338, the entire outer diameter of seal ring 326 would seal against bore 72. With only a portion of seal ring 326 actively sealing against bore 72, i.e. segment 330, a much lower overall outward radial force is exerted by seal ring 326 on bore 72 than if all of the outer diameter of seal ring 326 were engaging bore 72. Ideally, the radial force between seal ring 326, piston assembly 300 and cylinder 58 is just sufficient to prevent fluid leakage. Radial forces greater than this desired magnitude will result in unnecessary frictional losses due to seal ring 326 rubbing against bore 72 of cylinder 58 thereby reducing the overall efficiency of the operation of the hydraulic unit. Because it is symmetrical, seal ring 326 is able to seal fluid bi-directionally along bore 72.

FIG. 20 is similar to FIG. 11A with piston assemblies 300 replacing piston assemblies 60. Again, the particular position a piston assembly 300 and a corresponding cylinder 58 have relative to a lobe 50 on rotary cam 48 is designated by letters A-D. The arrow indicates the direction of rotation of rotary cam 52. The cluster of piston assemblies 300 and cylinders 58 are shown operating as a pump. Chamber 92A is shown being filled with low pressure fluid which passes through piston assembly 300B and its upper internal passage 306B which fluidly connects B port 66B with control port 68B. High pressure fluid is shown being pumped out of chamber 92C and through lower internal passage 308D to reach A port 64D which is connected to high pressure A conduit 100 (not shown). Therefore, controlling piston assemblies 300B and D are shown controlling the flow of fluid into and out of chambers 92A and 92C of controlled pistons 300A and 300C. It will be appreciated that the cluster of piston assemblies 300A-D and cylinder 58A-D can also be used as a motor if high and low pressure fluid are supplied, respectively, to B conduit 102 and A conduit 100. Fluid will then drive piston assemblies 300A-D causing rotary cam 52 to rotate.

Turning now to FIG. 22, follower assembly 304 includes a yoke 344 connected to body 302 and having a pair of laterally spaced arms 346 which support a roller pin 348. A roller 350 rotates upon ball bearings 352 and roller bearings 353 which ride upon roller pin 348. A pair of compliant springs comprising belleville washers 354 and 355 are disposed about roller pin 348 and between arms 346 and ball bearings 352 to locate roller 350. Belleville washers 354 and 355 are arranged to oppose one another with their outer diameters being in contact and their inner diameters forming annular gaps 356 therebetween.

Roller 350 tracks along a planar central path on the radial surface of rotary cam 48 as rotary cam 48 rotates. Ideally, the axis of roller 350 remains perfectly parallel with the axis of rotary cam 48. However, imperfections in the manufacture of the parts involved and normal operating clearances and deflections allow for small misalignments and therefore roller 350 will deviate laterally from the planar path. Because the radial forces between rotary cam 48 and roller 350 are very high, misalignment can cause considerable end thrust to be developed if roller 350 is too rigidly constrained against lateral movement.

Belleville washers 354 and 355 and gap 356 allow roller 350 to stray slightly laterally from its planar central path during the high force portion of its piston's reciprocation. Force equal to the decrease in gap 356 times the spring rate of the combination of belleville washers 354 and 355 is transferred to yoke 344 and then to body 302. If solid spacer rings were used instead of belleville washers 354 and 355, the axially stray of roller 356 would be more limited and accordingly, a much higher end thrust would be transferred to yoke 344 and body 302. This force, in turn, would increase the frictional engagement between body 302 and bore 72 of a cylinder 58. Therefore, by employing belleville washers 354 and 355 as compliant springs, the end thrust transferred to body 302 is reduced and the overall efficiency of the operation of the hydraulic unit is increased.

Belleville washers 354 and 355 return roller 350 to its center position during the return stroke of piston assembly 300 when radial forces are decreased. For operation of the hydraulic unit as a pump, the return stroke is the portion of the cycle when the piston assembly 300 moves radially inward, while for a hydraulic motor, the return stroke is when piston assembly 300 moves radially outward.

B. Dynamic Seal With Piloted Intermediate Member

FIG. 22 also depicts an alternative embodiment of a pair of axially spaced sealing mechanisms 358 sealing between rotary cam 48 and stationary member 52 to thereby create an annular scavenge chamber for receiving fluid escaping from between piston assemblies 300 and cylinders 58. The concentricity between rotary cam 48 and stationary member 52 cannot be precisely controlled because of the circuitous path and the large number of parts involved in piloting each component. Concentricity is also aggravated by operating deflections caused by the high deceleration forces during jounce and rebound of the wheel and tire on the road. To better accommodate a proper seal, annular intermediate members 360 and annular inner race members 362 of sealing mechanism 358 are interposed between stationary member 52 and rotary cam 48. Although, not preferred, it is also possible to make rotary cam 52 and inner race members 362 a single unitary piece.

With respect to each sealing mechanism 358, attached to rotary cam 48 is inner race member 362. An annular O-ring 364 is captured between rotary cam 48 and inner race member 362 and functions both as a radial seal and as a face seal. Rotary cam 48, O-ring 364 and inner race member 362 rotate as one unit with the wheel to which rotary cam 48 is secured.

Intermediate member 360 is non-rotatable and mounts within a bore of stationary member 52. Stationary member 52 has an annular notch 366 which mates with a cooperating annular notch 368 on intermediate member 360 to axially retain intermediate member 360 within stationary member 52. A radial gap 369 exists between stationary member 52 and intermediate member 360 to accommodate radial movement. Intermediate member 360 also has an annular L-shaped seal recess 370 on its outer diameter which cooperates with a wedge-shaped annulus portion 374 of a seal plate 376 to compressively retain an annular static O-ring seal 380 therebetween. Seal plate 376 pilots off of stationary member 52. Static seal 380 acts both as a radial seal between stationary member 52 and seal plate 376 and as a face seal between seal plate 376 and intermediate member 360. An annular end plate 382 is threadedly attached to intermediate member 360 and acts to compress seal plate 376 against static seal 380.

A dynamic seal is needed to seal between non-rotating intermediate member 360 and rotatable inner race member 362. Two alternative embodiments of dynamic seals are shown in FIGS. 23A and 23B.

Figure 23A:
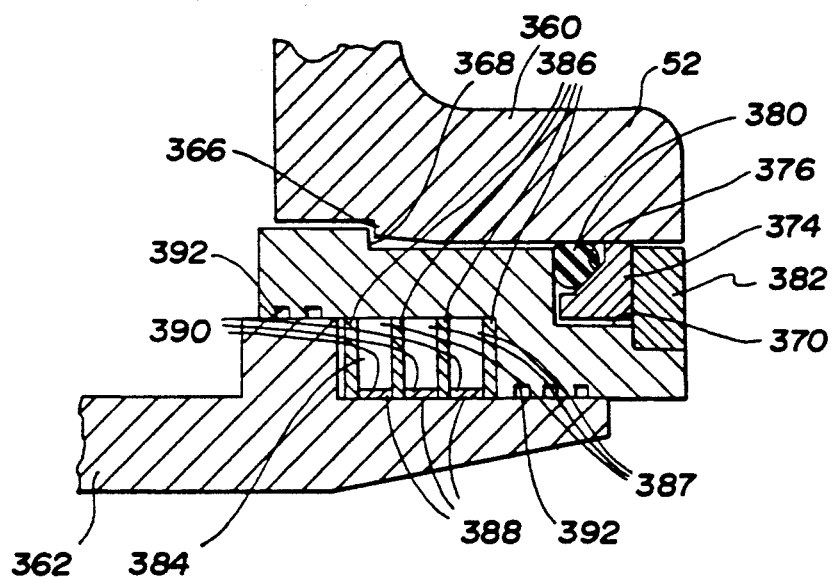
FIGS. 23A and 23B show portions of a sealing mechanism utilizing a ferrofluidic seal and an elastomeric lip seal, respectively.
Figure 23B:
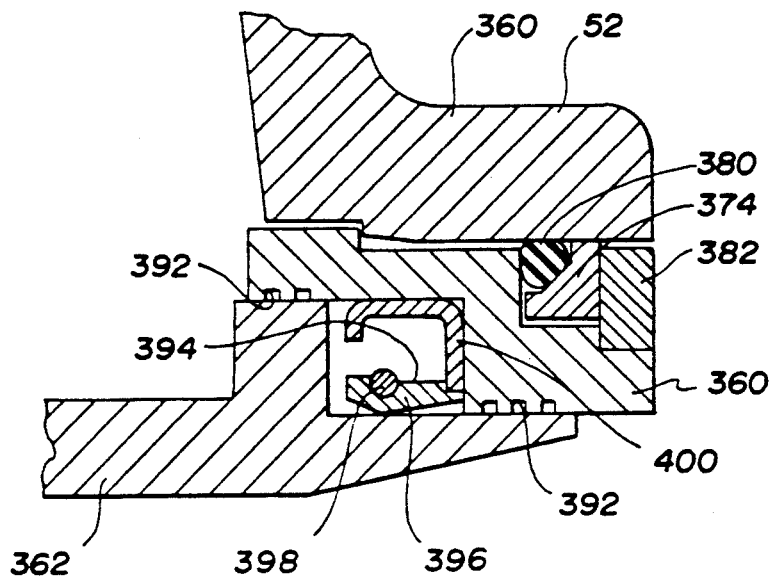

FIGS. 22 and 23A show the use of a ferrofluidic rotary seal 384. Ferrofluidic seal 384 consists of a system of alternating pole pieces 386 and permanent magnets 387 which create a magnetic field across closely controlled gaps 388 between intermediate member 360 and inner race member 362. Gaps 388 are filled with a fluid 390 containing a magnetically permeable metal emulsion. Inner race member 362 is made of a magnetically permeable material such as steel. The result is a very efficient dynamic seal with low friction drag.

Intermediate member 360 discussed above is non-magnetic, preferably a resilient plastic, and pilots the pole pieces 386 and magnets 387 of ferrofluidic seal 384. Along the inner diameter of intermediate member 360 are circumferential grooves 392 which act as labyrinth seals to minimize contamination of the fluid 390 by the hydraulic fluid on the inside of the hydraulic unit or by water and dirt on the outside of the unit. It may be desirable for initial break-in to pack grooves 392 with a high temperature grease.

Ferrofluidic seals are available from Ferrofluidics Corporation of Nashua, N.H. The ferrofluidic seal is made in accordance with the principles disclosed in U.S. Pat. No. 4,252,353, which has been incorporated by reference herein.

Alternatively, as shown in FIG. 23B, an annular lip seal 394 may be used in place of the ferrofluidic seal 384. Lip seal 394 includes an elastomeric member 396 which receives an annular garter spring 398 in its outer diameter therein for radial reinforcement. An inverted L-shaped housing 400, is attached to one end and provides further radial support and stability to member 396.

In summary, intermediate member 360 and inner race member 362 remain relatively concentric with one another during rotation of rotary cam 48 with gap 369 and static seal 380 accommodating radial movement between rotary cam 48 and stationary member 52. This allows radial gap 388 between intermediate member 360 and inner race member 362 to remain small and constant during operation of a hydraulic unit.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

What is claimed is:

1. A hydraulic unit adapted for use with a wheel of a vehicle, the hydraulic unit comprising:
   A and B conduits connectable with low and high pressure sources of fluid;
   a rotary cam having a plurality of circumaxially spaced lobes and being adapted to affix to the wheel to turn therewith;
   a stationary member being adapted to affix to the vehicle adjacent the rotary cam and having a plurality of circumaxially spaced and radially extending cylinders, each cylinder having A and B ports in fluid communication with the A and B conduits, a control port located adjacent the A and B ports, and a chamber port spaced from the A, B and control ports and fluidly coupled to a control port of another cylinder; and
   a plurality of pistons, each piston having a body and a follower, each body being reciprocable within a respective cylinder to define a variable volume chamber, the chamber port of each cylinder being in fluid communication with variable volume chamber and being isolated from its A and B ports, at least one piston having a first internal passage within its body which fluidly connects and disconnects the control port of a cylinder with one of the A or B. ports of that cylinder during reciprocation of the piston as the follower engages the rotary cam;
   wherein the pistons serve to control the flow of fluid into and out of variable volume chambers of other pistons in timed sequence with the rotary cam.

2. The hydraulic unit of claim 1 wherein:
   the body of the piston further includes a second internal passage, the first and second passages alternately fluidly connecting and disconnecting the control port of a cylinder with the A and B ports of that cylinder during reciprocation of the at least one piston.

3. The hydraulic unit of claim 1 wherein:
   the body of the piston includes four circumferentially extending seal recesses with the A port, the control port and the B port being sandwiched therebetween and each seal recess has a seal ring received therein for sealing between the body and its respective cylinder;
   wherein the seal rings prevent fluid from passing between ports of the respective cylinder during reciprocation of the at least one body of the piston.

4. The hydraulic unit of claim 1 further comprising:
   a seal ring; and
   the body of a piston includes a circumferentially extending seal recess therein for receiving the seal ring;
   wherein the seal ring seals between the at least one body and its respective cylinder to thereby prevent fluid from flowing between a pair of the ports of the respective cylinder.

5. The hydraulic unit of claim 4 wherein:
   at least one cylinder has an internal circumferentially extending recess in fluid communication with one of the A port, the B port or the control port of that cylinder; and
   wherein the seal ring is of sufficient size that it cannot be received in the recess in the cylinder but may be received in the piston seal recess.

6. The hydraulic unit of claim 4 wherein:
   the seal ring is C-shaped in cross-section having an annular recess in its outer diameter, the seal ring including a first segment, a second segment and an intermediate bight segment connecting therebetween and defining the annular recess, and the bight segment having openings extending from its outer diameter to its inner diameter;
   wherein when the seal ring is subjected to fluids having differing pressures on each of its first and second segments, that segment adjacent the lower pressure fluid seals between the piston and the cylinder with the other of the first or second segments being surrounded by the high pressure fluid such that only the segment subject to the low pressure fluid seals between the piston and the cylinder.

7. A hydraulic unit adapted for use with a wheel of a vehicle to operate as pump to pump fluid or as a motor to turn the wheel or both, the hydraulic unit comprising:

a rotary cam adapted to be affixed to the wheel to turn therewith and having a plurality of lobes;

a plurality of circumaxially spaced and radially extending cylinders;

a plurality of pistons, each piston having a body and a follower, each follower being engageable with the lobes of the rotary cam to reciprocate its piston within a cylinder to pump fluid from the cylinder as the rotary cam rotates and the body having a circumferentially extending seal recess; and a seal ring received within the seal recess to seal between the piston and the cylinder, the seal ring being C-shaped in cross-section having an annular recess in its outer diameter and including a first segment, a second segment and an intermediate bight segment connecting therebetween and defining the annular recess, and the bight segment having openings extending from its outer diameter to its inner diameter;

wherein when the seal ring is subjected to fluids having differing pressures on each of its first and second segments, that segment adjacent the lower pressure fluid seals between the piston and the cylinder with the other of the first or second segments being surrounded by the higher pressure fluid such that only the segment subject to the lower pressure fluid seals between the piston and the cylinder.

8. A hydraulic unit adapted for use with a wheel of a vehicle to operate as pump to pump fluid or as a motor to turn the wheel or both, the hydraulic unit comprising:

a rotary cam adapted to be affixed to the wheel to turn therewith and having a plurality of lobes;

a plurality of circumaxially spaced and radially extending cylinders;

a plurality of pistons, each piston having a body and a follower assembly;

at least one follower assembly having a yoke with a pair of laterally spaced apart arms, a roller pin extending longitudinally between and being supported by the arms of the yoke, a roller which rolls along a planar central path upon the rotary cam creating a variable radial force therebetween, bearings located between the roller and the roller pin which allow the roller to rotate about the roller pin and a compliant spring interposed between an arm of the yoke and the roller or the bearings to position the roller relative to the arms of the yoke;

wherein the compliant spring allows the roller to longitudinally stray from the planar central path during high radial force portions of its piston's reciprocation and then returns the roller to the central planar path during low radial force portions of its piston's reciprocation.

9. The hydraulic unit of claim 8 wherein:
the compliant spring includes a pair of belleville washers surrounding the roller pin and in opposed contact with one another to provide a gap therebetween whereby the belleville washers deflect with the size of the gap varying to accommodate lateral movement of the roller when it strays from the planar central path.

10. The hydraulic unit of claim 8 wherein:
there are a pair of longitudinally spaced springs, a spring being disposed between each arm and bearings or the roller.

11. A hydraulic unit adapted for use with a wheel of a vehicle to operate as pump to pump fluid or as a motor to turn the wheel or both, the hydraulic unit comprising:

a rotary cam adapted to be affixed to the wheel to turn therewith and having a plurality of lobes;

a plurality of circumaxially spaced and radially extending cylinders;

a plurality of pistons, each piston having a body and a follower, each follower being engageable with the lobes of the rotary cam to reciprocate its piston within a cylinder to pump fluid from the cylinder as the rotary cam rotates;

a stationary member supporting the cylinders and being adapted to affix to the vehicle; and a pair of laterally spaced sealing mechanisms which seal between the stationary member and the rotary cam to provide an annular scavenge chamber for collecting fluid which escapes from between the pistons and the cylinders, at least one sealing mechanism including:

an annular non-rotating intermediate member which pilots relative to and remains concentric with the rotary cam during rotation of the rotary cam;

an annular dynamic seal interposed between the intermediate member and the rotary cam to accommodate rotational movement between the intermediate member and the rotary cam; and an annular static seal interposed between the intermediate member and the stationary member to seal and to accommodate radial movement therebetween during rotation of the rotary member.

12. The hydraulic unit of claim 11 wherein:
the dynamic seal is a ferrofluidic seal having permanent magnets, pole pieces and a magnetic permeable fluid which is captured between the rotary member and the intermediate member.

13. The hydraulic unit of claim 11 wherein:
the dynamic seal is an elastomeric lip seal.

14. The hydraulic unit of claim 11 further comprising:
an annular seal plate having a wedge-shaped annulus formed therein; and
the intermediate member having an annular recess formed therein to receive the seal plate;
wherein the wedge-shaped annulus, the recess of the intermediate member and the stationary member cooperate to capture the static seal therebetween with the static seal acting as both a radial seal between the stationary member and the seal plate and as a face seal between the intermediate member and the seal plate.

15. The hydraulic unit of claim 11 further comprising:
an annular inner race member interposed between the intermediate member and the rotary cam, the inner race member being rotatable with the rotary cam;
wherein the dynamic seal seals between the inner race member and the intermediate member.

16. The hydraulic unit of claim 15 wherein:

the dynamic seal is a ferrofluidic seal having permanent magnets, poles pieces and a ferrofluidic fluid which is captured between the intermediate member and the inner race member.

17. The hydraulic unit of claim 15 wherein:
either the inner race member or the intermediate member has labyrinth grooves therein which provides a seal between the inner race member and the intermediate member.

* * * * *

UNITED STATES PATENT AND TRADEMARK OFFICE
CERTIFICATE OF CORRECTION

PATENT NO. : 5,323,688

DATED : June 28, 1994

INVENTOR(S) : Frank H. Walker

It is certified that error appears in the above-identified patent and that said Letters Patent is hereby corrected as shown below:

Column 5, Line 36                                                                  after "location" delete --of a pair--;

Column 5, Line 37                                                                  after "within" and before "vehicle" delete --a--; and "wheel" should be --wheels--;

Column 6, Line 16                                                                  , after "is" insert --a--;

Column 6, Line 54                                                                  after "in" (second occurrence) insert --a--;

Column 6, Line 66                                                                  should be --21--;

Column 7, Line 28                                                                  after "with" delete --a--;

UNITED STATES PATENT AND TRADEMARK OFFICE
CERTIFICATE OF CORRECTION

PATENT NO. : 5,323,688
DATED : June 28, 1994
INVENTOR(S) : Frank H. Walker

It is certified that error appears in the above-identified patent and that said Letters Patent is hereby corrected as shown below:

Column 8, Line 29          delete "hydrostatic" and insert --hydraulic--;

Column 8, Line 43          after "operation" insert --of--; and delete "is" and insert --are--;

Column 8, Line 49          delete "radial";

Column 9, Line 33          after "connected" insert --to--;

Column 9, Line 37          "7" should be --9--;

Column 9, Line 48          "it" should be --its--;

Column 9, Line 58          after "fluid" insert --,--;

UNITED STATES PATENT AND TRADEMARK OFFICE
CERTIFICATE OF CORRECTION

PATENT NO. : 5,323,688

DATED : June 28, 1994

INVENTOR(S) : Frank H. Walker

It is certified that error appears in the above-identified patent and that said Letters Patent is hereby corrected as shown below:

Column 10, Line 2          delete "pump";

Column 10, Line 18         "70" should be --92--;

Column 10, Line 20         "clusters" should be --cluster--;

Column 10, Line 29         after "rotation" insert --of a rotary cam--;

Column 10, Line 33         "numeral" should be --numerical--;

Column 11, Line 22         23, Line 8), "hydrostatic" should be --hydraulic--;

Column 11, Lines 23-24     "hydrostatic" should be --hydraulic--;

Column 10, Line 33         "carry" should be --carries--;

Column 11, Line 65         delete "Conduit A" and insert --A conduit--;

UNITED STATES PATENT AND TRADEMARK OFFICE
CERTIFICATE OF CORRECTION

PATENT NO.   : 5,323,688

DATED        : June 28, 1994

INVENTOR(S)  : Frank H. Walker

It is certified that error appears in the above-identified patent and that said Letters Patent is hereby corrected as shown below:

Column 11, Line 66 (Appln. Page 24, Line 19), after "and" insert --B--; and after "conduit" delete --B--;

Column 12, Line 1 (Appln. Page 24, Line 22), after "into" insert --B--; and after "conduit" delete --B--;

Column 12, Line 25 (Appln. Page 25, Line 13), "outward" should be --outwardly--;

Column 14, Lines 29-30 (Appln. Page 29, Line 25), "point E" should be --points E and F--;

Column 14, Line 34 (Appln. Page 29, Line 29), after "Likewise," delete --a--;

Column 14, Line 35 (Appln. Page 29, Line 30), after "124" insert --,--; and delete "is"; and after "F" insert --,--;

Column 14, Line 46 (Appln. Page 30, Line 8), after "that" insert --for--; and after "24" insert --,--;

Column 15, Line 23 (Appln. Page 31, Line 22), after "28" insert --,--;

Column 15, Line 45 (Appln. Page 32, Line 8), "show" should be --shows--;

UNITED STATES PATENT AND TRADEMARK OFFICE
CERTIFICATE OF CORRECTION

PATENT NO. : 5,323,688

DATED : June 28, 1994

INVENTOR(S) : Frank H. Walker

It is certified that error appears in the above-identified patent and that said Letters Patent is hereby corrected as shown below:

Column 15, Line 54 (Appln. Page 32, Line 17), "122" should be --121--; and "123" should be --122--;

Column 15, Line 59 (Appln. Page 32, Line 22), delete "Conduits"; after "A" insert --conduit--; after "B" insert --conduit--; after "A'" insert --conduit--; and after "B'" insert --conduit--;

Column 15, Line 68 (Appln. Page 32, Line 31), "122" should be --121--; and "123" should be --122--;

Column 16, Lines 2-3 (Appln. Page 33, Lines 3-4), delete "conduits"; after "A" insert --conduit--; after "B" insert --conduit--; after "vent" insert --conduit--; after "A'" insert --conduit--; after "B'" insert --conduit--; and after "scavenge" insert --conduit--;

Column 16, Line 7 (Appln. Page 33, Line 7), after "its" delete "conduits"; and after "A" insert --conduit--; and after "B" insert --conduit;

Column 16, Line 10 (Appln. Page 33, Line 10), "a" should be --of--;

Column 16, Lines 25-26 (Appln. Page 33, Line 26), "attached" should be --attach--;

UNITED STATES PATENT AND TRADEMARK OFFICE
CERTIFICATE OF CORRECTION

PATENT NO. : 5,323,688

DATED : June 28, 1994

INVENTOR(S) : Frank H. Walker

It is certified that error appears in the above-identified patent and that said Letters Patent is hereby corrected as shown below:

Column 16, Line 32 (Appln. Page 33, Line 32), "is" should be --are--;

Column 16, Line 33 (Appln. Page 33, Line 33), after "on" delete --a--;

Column 16, Line 33 (Appln. Page 34, Line 1), after "vehicle" insert --21--;

Column 16, Line 37 (Appln. Page 34, Line 4), "casting" should be --insert--;

Column 16, Line 41 (Appln. Page 34, Line 9), "30" should be --21--;

Column 16, Line 47 (Appln. Page 34, Line 14), delete "94B" and insert --94D--;

Column 17, Lines 5-6 (Appln. Page 35, Lines 8-9), after "57" delete --with respect to one another--;

Column 17, Line 18 (Appln. Page 35, Line 20), "52" should be --53--;

Column 17, Line 39 (Appln. Page 36, Line 9), "140" should be --138--; and "142" should be --139--;

UNITED STATES PATENT AND TRADEMARK OFFICE
CERTIFICATE OF CORRECTION

PATENT NO. : 5,323,688

DATED : June 28, 1994

INVENTOR(S) : Frank H. Walker

It is certified that error appears in the above-identified patent and that said Letters Patent is hereby corrected as shown below:

Column 17, Line 41 (Appln. Page 36, Lines 11-12), after "Similarly," delete --seal members 138 and 140-- and insert --grooves 146 and 147--;

Column 17, Lines 44-45 (Appln. Page 36, Line 15), "are" should be --is--; and "123" should be --150--;

Column 17, Line 51 (Appln. Page 36, Line 20), "44" should be --36--;

Column 17, Line 54 (Appln. Page 36, Line 23), "44" should be --36--;

Column 17, Line 56 (Appln. Page 36, Line 25), "44" should be --36--;

Column 18, Line 1 (Appln. Page 37, Line 8), after "162" insert --which is--;

Column 18, Line 26 (Appln. Page 38, Line 1), "166" should be --169--;

UNITED STATES PATENT AND TRADEMARK OFFICE
CERTIFICATE OF CORRECTION

PATENT NO. : 5,323,688
DATED : June 28, 1994
INVENTOR(S) : Frank H. Walker

It is certified that error appears in the above-identified patent and that said Letters Patent is hereby corrected as shown below:

Column 18, Line 54 (Appln. Page 38, Line 28), before "vacuum" insert --a--;

Column 18, Line 56 (Appln. Page 38, Line 30), after "192" delete --, storage reservoir 37--;

Column 19, Line 2 (Appln. Page 39, Line 12), "units" should be --unit--;

Column 19, Line 8 (Appln. Page 39, Line 18), "106'" should be --108'--; and "108'" should be --110'--;

Column 19, Line 9 (Appln. Page 39, Line 19), "106" should be --108--;

Column 19, Line 9 (Appln. Page 39, Line 20), "108" should be --110--;

Column 19, Lines 50-51 (Appln. Page 40, Line 28), "106" should be --108--; and "108" should be --110--;

Column 19, Line 54 (Appln. Page 40, Line 31), after "depending" insert --on--;

UNITED STATES PATENT AND TRADEMARK OFFICE
CERTIFICATE OF CORRECTION

PATENT NO. : 5,323,688

DATED : June 28, 1994

INVENTOR(S) : Frank H. Walker

It is certified that error appears in the above-identified patent and that said Letters Patent is hereby corrected as shown below:

Column 19, Line 55 (Appln. Page 40, Line 32), "42" should be --34--;

Column 19, Line 59 (Appln. Page 41, Line 4), "208" should be --216--;

Column 19, Line 60 (Appln. Page 41, Line 5), "valve 40" should be --valves 32 and 33--;

Column 20, Line 5 (Appln. Page 41, Line 17), after "may" insert --be--;

Column 20, Line 20 (Appln. Page 41, Line 32), "42" should be --34--; and after "is" insert --in--;

Column 20, Line 54 (Appln. Page 42, Line 33), "37" should be --38--;

Column 20, Line 60 (Appln. Page 43, Line 6), "42" should be --34--;

Column 20, Line 65 (Appln. Page 43, Line 11), after "chamber" insert --150--;

UNITED STATES PATENT AND TRADEMARK OFFICE
CERTIFICATE OF CORRECTION

PATENT NO. : 5,323,688

DATED : June 28, 1994

INVENTOR(S) : Frank H. Walker

It is certified that error appears in the above-identified patent and that said Letters Patent is hereby corrected as shown below:

Column 21, Line 23 (Appln. Page 44, Line 6), "37" should be --38--;

Column 21, Line 34 (Appln. Page 44, Line 17), "37" should be --38--;

Column 21, Line 43 (Appln. Page 44, Lines 25), "26" should be --24--;

Column 21, Line 43 (Appln. Page 44, Line 26), after "46" insert --to--;

Column 21, Line 45 (Appln. Page 44, Line 27), "30" should be --21--;

Column 21, Lines 49-50 (Appln. Page 44, Lines 31-33), delete "Regeneration spool valve 34 is positioned downwardly into the deceleration mode."; and after "37" should be --38--;

UNITED STATES PATENT AND TRADEMARK OFFICE
CERTIFICATE OF CORRECTION

PATENT NO. : 5,323,688

DATED : June 28, 1994

INVENTOR(S) : Frank H. Walker

It is certified that error appears in the above-identified patent and that said Letters Patent is hereby corrected as shown below:

Column 21, Line 56 (Appln. Page 45, Line 5), "30" should be --21--;

Column 21, Line 57 (Appln. Page 45, Line 6), "42" should be --34-;

Column 21, Line 58 (Appln. Page 45, Line 7), after "valves" insert --32 and 33--;

Column 21, Line 60 (Appln. Page 45, Line 9), "37" should be --38--;

Column 21, Line 68 (Appln. Page 45, Line 16), "237" should be --38--.

Signed and Sealed this

Twenty-fourth Day of October, 1995

Attest:

BRUCE LEHMAN

*Attesting Officer*     *Commissioner of Patents and Trademarks*